US011239941B2

(12) United States Patent
Nguyen et al.

(10) Patent No.: US 11,239,941 B2
(45) Date of Patent: Feb. 1, 2022

(54) FEEDBACK TECHNIQUES FOR WIRELESS COMMUNICATIONS

(71) Applicant: QUALCOMM Incorporated, San Diego, CA (US)

(72) Inventors: Tien Viet Nguyen, Bridgewater, NJ (US); Kapil Gulati, Hillsborough, NJ (US); Sudhir Kumar Baghel, Hillsborough, NJ (US); Arjun Bharadwaj, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 16/746,686

(22) Filed: Jan. 17, 2020

(65) Prior Publication Data

US 2020/0235848 A1 Jul. 23, 2020

Related U.S. Application Data

(60) Provisional application No. 62/794,684, filed on Jan. 20, 2019.

(51) Int. Cl.
*H04L 5/00* (2006.01)
*H04L 1/00* (2006.01)
(Continued)

(52) U.S. Cl.
CPC ......... *H04L 1/0038* (2013.01); *H04B 17/318* (2015.01); *H04L 1/0003* (2013.01);
(Continued)

(58) Field of Classification Search
CPC ... H04L 1/0038; H04L 5/0051; H04L 1/0003; H04B 17/318; H04W 4/40; H04W 28/0268; H04W 28/26
See application file for complete search history.

(56) References Cited

U.S. PATENT DOCUMENTS

2016/0128090 A1 5/2016 Azarian Yazdi et al.
2017/0164396 A1* 6/2017 Matsumoto ........... H04W 72/02
(Continued)

FOREIGN PATENT DOCUMENTS

WO WO-2013055034 A1 4/2013
WO WO-2016164140 A1 10/2016
(Continued)

OTHER PUBLICATIONS

International Search Report and Written Opinion—PCT/US2020/014231—ISA/EPO—dated Sep. 21, 2020.
(Continued)

*Primary Examiner* — Fahmida S Chowdhury
(74) *Attorney, Agent, or Firm* — Danai Nelisile Mhembere; Holland & Hart LLP

(57) ABSTRACT

Methods, systems, and devices for wireless communications are described. A device, which may be otherwise known as user equipment (UE) may support sidelink communications, for example, such as device-to-device (D2D) communications, vehicle-based communications, which may also be referred to as vehicle-to-everything (V2X) communications, vehicle-to-vehicle (V2V) communications, and the like. To mitigate or decrease collisions or other interference on resources (e.g., time and frequency resources) used by other UEs in sidelink communications, a UE may determine a blind retransmission of a packet, determine that the packet satisfies one or more conditions based in part on the blind retransmission, and transmit feedback signal relating to the blind retransmission of the packet.

31 Claims, 14 Drawing Sheets

(51) Int. Cl.
  *H04B 17/318* (2015.01)
  *H04W 4/40* (2018.01)
  *H04W 28/02* (2009.01)
  *H04W 72/10* (2009.01)
  *H04W 28/26* (2009.01)

(52) U.S. Cl.
  CPC ............ *H04L 5/0051* (2013.01); *H04W 4/40* (2018.02); *H04W 28/0268* (2013.01); *H04W 28/26* (2013.01); *H04W 72/10* (2013.01)

(56) References Cited

U.S. PATENT DOCUMENTS

| | | | |
|---|---|---|---|
| 2017/0230959 A1* | 8/2017 | Wu | H04L 5/0044 |
| 2017/0273055 A1* | 9/2017 | Xu | H04W 72/04 |
| 2018/0063816 A1* | 3/2018 | Gulati | H04W 72/0446 |
| 2018/0097548 A1 | 4/2018 | Kim et al. | |
| 2018/0123767 A1* | 5/2018 | Islam | H04L 1/189 |
| 2018/0220280 A1 | 8/2018 | Baghel | |
| 2019/0013903 A1* | 1/2019 | Zhang | H04W 72/0453 |
| 2019/0165917 A1 | 5/2019 | Choi et al. | |
| 2019/0229853 A1* | 7/2019 | Lee | H04W 24/08 |
| 2020/0037314 A1* | 1/2020 | Xiong | H04L 5/0091 |
| 2020/0112400 A1* | 4/2020 | Lee | H04W 76/11 |
| 2020/0305176 A1* | 9/2020 | Hu | H04B 7/0456 |

FOREIGN PATENT DOCUMENTS

| | | |
|---|---|---|
| WO | WO-2017213275 A1 | 12/2017 |
| WO | WO-2018084608 A2 | 5/2018 |
| WO | WO-2018134183 A1 | 7/2018 |

OTHER PUBLICATIONS

Qualcomm Incorporated: "Sidelink Resource Allocation Mechanism for NR V2X", 3GPP Draft, 3GPP TSG RAN WG1 Ad-Hoc Meeting 1901, R1-1900887, Sidelink Resource Allocation Mechanism for NR V2X, 3rd Generation Partnership Project (3GPP), Mobile Competence Centre, 650, Route Des Lucioles, F-06921 Sophia-Antipolis Cedex, vol. RAN WG1, No. Taipei, Taiwan, Jan. 21, 2019-Jan. 25, 2019, Jan. 12, 2019 (Jan. 12, 2019), XP051576424, 10 pages, Retrieved from the Internet: URL: http://www.3gpp.org/ftp/tsg%5Fran/WG1%5FRL1/TSGR1%5FAH/NR%5FAH%5F1901/Docs/R1%2D1900887%2Ezip, [retrieved on Jan. 12, 2019] paragraph [0001], paragraph [0003], paragraph [0006], paragraph [0009], figures 2,3.

Partial International Search Report—PCT/US2020/014231—ISA/EPO—dated May 18, 2020.

* cited by examiner

FEEDBACK TECHNIQUES FOR WIRELESS COMMUNICATIONS

CROSS REFERENCE

The present application for patent claims the benefit of U.S. Provisional Patent Application No. 62/794,684 by NGUYEN, et al., entitled "FEEDBACK TECHNIQUES FOR VEHICLE-TO-EVERYTHING COMMUNICATIONS," filed Jan. 20, 2019, assigned to the assignee hereof, and expressly incorporated herein.

INTRODUCTION

The following relates to wireless communications, and more specifically to feedback techniques for sidelink communications.

Communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support sidelink communications between communications devices (e.g., direct communications between multiple UEs). Examples of sidelink communications may include, but are not limited to, device-to-device (D2D) communications, vehicle-based communications, which may also be referred to as V2X networks, vehicle-to-vehicle (V2V) networks, cellular V2X (C-V2X) networks, and the like.

SUMMARY

A method of wireless communications at a first device in a wireless communications system is described. The method may include determining a blind retransmission of a packet, determining that the packet satisfies one or more conditions based on the blind retransmission, and transmitting a feedback signal relating to the blind retransmission of the packet based on determining that the packet satisfies the one or more conditions.

An apparatus for wireless communication in a wireless communications system is described. The apparatus may include a processor, memory coupled to the processor, the processor and memory configured to determine a blind retransmission of a packet, determine that the packet satisfies one or more conditions based on the blind retransmission, and transmit a feedback signal relating to the blind retransmission of the packet based on the determination that the packet satisfies the one or more conditions.

Another apparatus for wireless communication in a wireless communications system is described. The apparatus may include means for determining a blind retransmission of a packet, means for determining that the packet satisfies one or more conditions based on the blind retransmission, and means for transmitting a feedback signal relating to the blind retransmission of the packet based on determining that the packet satisfies the one or more conditions.

A non-transitory computer-readable medium storing code for wireless communication at a first device in a wireless communications system is described. The code may include instructions executable by a processor to determine a blind retransmission of a packet, determine that the packet satisfies one or more conditions based on the blind retransmission, and transmit a feedback signal relating to the blind retransmission of the packet based on the determination that the packet satisfies the one or more conditions.

Some examples of the method, apparatuses, and non-transitory computer-readable medium described herein for determining that the packet satisfies the one or more conditions may further include operations, features, means, or instructions for determining a hidden node condition associated with the first device in wireless communications with a second device based on a reference signal received power (RSRP) of the packet, a non-line of sight (NLOS) condition associated with the second device in wireless communications with the first device, or a blocking condition associated with the first device in wireless communications with the second device, or a combination thereof. In some examples of the method, apparatuses, and non-transitory computer-readable medium described herein, transmitting the feedback signal is based on the hidden node condition.

Some examples of the method, apparatuses, and non-transitory computer-readable medium described herein may further include operations, features, means, or instructions for measuring the RSRP of the packet, and determining that the RSRP of the packet satisfies an RSRP threshold. In some examples of the method, apparatuses, and non-transitory computer-readable medium described herein, transmitting the feedback signal is based on the RSRP of the packet satisfying the RSRP threshold.

Some examples of the method, apparatuses, and non-transitory computer-readable medium described herein may further include operations, features, means, or instructions for determining the RSRP threshold. In some examples of the method, apparatuses, and non-transitory computer-readable medium described herein, determining that the RSRP of the packet satisfies the RSRP threshold is based on the determined RSRP threshold.

Some examples of the method, apparatuses, and non-transitory computer-readable medium described herein may further include operations, features, means, or instructions for determining the RSRP threshold based on a modulation and coding scheme (MC S), a priority of the packet corresponding to the feedback signal, a quality-of-service (QoS) of the packet corresponding to the feedback signal, or a 5G quality indicator (5QI) of the packet corresponding to the feedback signal, or a combination thereof.

Some examples of the method, apparatuses, and non-transitory computer-readable medium described herein may further include operations, features, means, or instructions for receiving, from a network device, control signaling including configuration information mapping the RSRP threshold to at least one of an MCS, a priority of the packet corresponding to the feedback signal, a QoS of the packet corresponding to the feedback signal, or a 5QI of the packet corresponding to the feedback signal, or a combination thereof, and determining the RSRP threshold based on the mapping.

Some examples of the method, apparatuses, and non-transitory computer-readable medium described herein may further include operations, features, means, or instructions for receiving, from the second device, control signaling including configuration information including the RSRP threshold, and determining the RSRP threshold based on the configuration information.

In some examples of the method, apparatuses, and non-transitory computer-readable medium described herein, the RSRP threshold is preconfigured or configured by a network device, or a combination thereof.

Some examples of the method, apparatuses, and non-transitory computer-readable medium described herein may further include operations, features, means, or instructions for determining location information of the second device, and determining the NLOS condition associated with the second device in wireless communications with the first device based on the location information of the second device. In some examples of the method, apparatuses, and non-transitory computer-readable medium described herein, location information of the second device indicates a location of the second device compared to a location of the first device, a pathloss estimation between the first device and the second device, or a combination thereof. In some examples of the method, apparatuses, and non-transitory computer-readable medium described herein, transmitting the feedback signal is based on the NLOS condition.

Some examples of the method, apparatuses, and non-transitory computer-readable medium described herein for determining that the packet satisfies the one or more conditions may further include operations, features, means, or instructions for determining a blocking condition associated with the first device in wireless communications with a second device based on a pathloss estimation between the first device and the second device. In some examples of the method, apparatuses, and non-transitory computer-readable medium described herein, the blocking condition includes, a pedestrian, a building, or an obstacle, or a combination thereof blocking a line of sight (LOS) path from the second device to the first device. In some examples of the method, apparatuses, and non-transitory computer-readable medium described herein, transmitting the feedback signal is based on the blocking condition.

Some examples of the method, apparatuses, and non-transitory computer-readable medium described herein may further include operations, features, means, or instructions for collecting sensor information from a set of sensors of the first device. In some examples of the method, apparatuses, and non-transitory computer-readable medium described herein, determining the blocking condition is further based on the collected sensor information. In some examples of the method, apparatuses, and non-transitory computer-readable medium described herein, the set of sensors includes a camera, a radar, or a lidar, or a combination thereof.

Some examples of the method, apparatuses, and non-transitory computer-readable medium described herein may further include operations, features, means, or instructions for receiving configuration information to configure the first device to transmit a second feedback signal. In some examples of the method, apparatuses, and non-transitory computer-readable medium described herein, the configuration information includes the one or more conditions.

In some examples of the method, apparatuses, and non-transitory computer-readable medium described herein, the wireless communications include sidelink communications.

In some examples of the method, apparatuses, and non-transitory computer-readable medium described herein, the sidelink communications includes V2X communications or D2D communications.

A method of wireless communications at a first device in a wireless communications system is described. The method may include receiving a feedback signal from a second device in the wireless communications system based on monitoring a feedback channel, determining that the feedback signal satisfies one or more conditions, and excluding, from one or more candidate resources, one or more resources that overlap with one or more reserved resources corresponding to the feedback signal based on the determining.

An apparatus for wireless communication in a wireless communications system is described. The apparatus may include a processor, memory coupled to the processor, the processor and memory configured to receive a feedback signal from a second apparatus in the wireless communications system based on monitoring a feedback channel, determine that the feedback signal satisfies one or more conditions, and exclude, from one or more candidate resources, one or more resources that overlap with one or more reserved resources corresponding to the feedback signal based on the determining.

Another apparatus for wireless communication in a wireless communications system is described. The apparatus may include means for receiving a feedback signal from a second apparatus in the wireless communications system based on monitoring a feedback channel, means for determining that the feedback signal satisfies one or more conditions, and means for excluding, from one or more candidate resources, one or more resources that overlap with one or more reserved resources corresponding to the feedback signal based on the determining.

A non-transitory computer-readable medium storing code for wireless communication at a first device in a wireless communications system is described. The code may include instructions executable by a processor to receive a feedback signal from a second device in the wireless communications system based on monitoring a feedback channel, determine that the feedback signal satisfies one or more conditions, and exclude, from one or more candidate resources, one or more resources that overlap with one or more reserved resources corresponding to the feedback signal based on the determining.

Some examples of the method, apparatuses, and non-transitory computer-readable medium described herein may further include operations, features, means, or instructions for receiving in a preceding packet an indication of the one or more reserved resources corresponding to the feedback signal, and determining the one or more reserved resources corresponding to the feedback signal based on the indication. In some examples of the method, apparatuses, and non-transitory computer-readable medium described herein, excluding, from the one or more candidate resources, the one or more resources that overlap with the one or more reserved resources corresponding to the feedback signal is based on the determined one or more reserved resources.

Some examples of the method, apparatuses, and non-transitory computer-readable medium described herein for determining that the feedback signal satisfies the one or more conditions may further include operations, features, means, or instructions for measuring an RSRP of the feedback signal based on monitoring the feedback channel, and determining that the RSRP of the feedback signal satisfies an RSRP threshold. In some examples of the method, apparatuses, and non-transitory computer-readable medium described herein, excluding, from the one or more candidate resources, the one or more resources that overlap with the one or more reserved resources of the feedback signal is based on the RSRP of the feedback signal satisfying the RSRP threshold.

Some examples of the method, apparatuses, and non-transitory computer-readable medium described herein may further include operations, features, means, or instructions for determining the RSRP threshold based on an MCS, a priority of the packet corresponding to the feedback signal, a QoS of the packet corresponding to the feedback signal, 5QI of a preceding transmission, or a 5QI of the packet corresponding to the feedback signal, or a combination thereof.

Some examples of the method, apparatuses, and non-transitory computer-readable medium described herein may further include operations, features, means, or instructions for receiving, from a network device, control signaling including configuration information mapping the RSRP threshold to at least one of an MCS, a priority of the packet corresponding to the feedback signal, a QoS of the packet corresponding to the feedback signal, or a 5QI of the packet corresponding to the feedback signal, or a combination thereof, and determining the RSRP threshold based on the mapping.

Some examples of the method, apparatuses, and non-transitory computer-readable medium described herein for determining that the feedback signal satisfies the one or more conditions may further include operations, features, means, or instructions for determining a distance between the first device and the second device in the wireless communications system, determining that the distance is greater than or equal to an exclusion distance value of the first device, and determining that an exclusion distance value of the second device excludes, from the one or more candidate resources, the one or more resources that overlap with the one or more reserved resources corresponding to the feedback signal.

Some examples of the method, apparatuses, and non-transitory computer-readable medium described herein may further include operations, features, means, or instructions for receiving configuration information to configure the first device to transmit a second feedback signal based at least in part on the one or more conditions.

A method of wireless communications at a first device in a wireless communications system is described. The method may include selecting one or more resources, receiving a feedback signal from a second device in the wireless communications system based on monitoring a feedback channel, determining that the feedback signal satisfies one or more conditions, and refraining from transmitting on the one or more resources that overlap with one or more reserved resources corresponding to the feedback signal based on the determining.

An apparatus for wireless communication in a wireless communications system is described. The apparatus may include a processor, memory coupled to the processor, the processor and memory configured to select one or more resources, receive a feedback signal from a second apparatus in the wireless communications system based on monitoring a feedback channel, determine that the feedback signal satisfies one or more conditions, and refrain from transmitting on the one or more resources that overlap with one or more reserved resources corresponding to the feedback signal based on the determining.

Another apparatus for wireless communication in a wireless communications system is described. The apparatus may include means for selecting one or more resources, means for receiving a feedback signal from a second apparatus in the wireless communications system based on monitoring a feedback channel, means for determining that the feedback signal satisfies one or more conditions, and means for refraining from transmitting on the one or more resources that overlap with one or more reserved resources corresponding to the feedback signal based on the determining.

A non-transitory computer-readable medium storing code for wireless communication at a first device in a wireless communications system is described. The code may include instructions executable by a processor to select one or more resources, receive a feedback signal from a second device in the wireless communications system based on monitoring a feedback channel, determine that the feedback signal satisfies one or more conditions, and refrain from transmitting on the one or more resources that overlap with one or more reserved resources corresponding to the feedback signal based on the determining.

Some examples of the method, apparatuses, and non-transitory computer-readable medium described herein may further include operations, features, means, or instructions for determining the one or more reserved resources corresponding to the feedback signal, where a condition of the one or more conditions includes that the one or more resources overlap the one or more reserved resources corresponding to the feedback signal, and transmitting an indication to refrain from transmitting on the one or more reserved resources based on the refraining.

Some examples of the method, apparatuses, and non-transitory computer-readable medium described herein may further include operations, features, means, or instructions for receiving in a preceding packet an indication of the one or more reserved resources corresponding to the feedback signal, and determining the one or more reserved resources corresponding to the feedback signal based on the indication. In some examples of the method, apparatuses, and non-transitory computer-readable medium described herein, refraining from transmitting on the one or more resources that overlap with the one or more reserved resources corresponding to the feedback signal is based on the determined one or more reserved resources corresponding to the feedback signal.

Some examples of the method, apparatuses, and non-transitory computer-readable medium described herein for determining that the feedback signal satisfies the one or more conditions may further include operations, features, means, or instructions for measuring an RSRP of the feedback signal based on monitoring the feedback channel, and determining that the RSRP of the feedback signal satisfies an RSRP threshold. In some examples of the method, apparatuses, and non-transitory computer-readable medium described herein, refraining from transmitting on the one or more resources that overlap with the one or more reserved resources corresponding to the feedback signal is based on the RSRP of the feedback signal satisfying the RSRP threshold.

Some examples of the method, apparatuses, and non-transitory computer-readable medium described herein may further include operations, features, means, or instructions for determining the RSRP threshold based on an MCS, a priority of the packet, a QoS of the packet corresponding to the feedback signal 5QI of a preceding transmission, or a 5QI of the packet corresponding to the feedback signal, or a combination thereof.

Some examples of the method, apparatuses, and non-transitory computer-readable medium described herein may further include operations, features, means, or instructions for receiving, from a network device, control signaling including configuration information mapping the RSRP threshold to at least one of an MCS, a priority of the packet corresponding to the feedback signal, a QoS of the packet corresponding to the feedback signal, or a 5QI of the packet corresponding to the feedback signal, or a combination thereof, and determining the RSRP threshold based on the mapping.

Some examples of the method, apparatuses, and non-transitory computer-readable medium described herein for determining that the feedback signal satisfies the one or more conditions may further include operations, features, means, or instructions for determining a distance between the first device and the second device in the wireless communications system, determining that the distance is greater than or equal to an exclusion distance value of the first device, and determining that an exclusion distance value of the second device excludes the one or more resources overlapping with the one or more reserved resources corresponding to the feedback signal, wherein refraining from transmitting on the one or more resources that overlap with the one or more reserved resources corresponding to the feedback signal is based on determining that the exclusion distance value of the second device excludes the one or more resources overlapping with the one or more reserved resources corresponding to the feedback signal.

A method of wireless communications at a first device in a wireless communications system is described. The method may include receiving a transmission comprising data from a second device, measuring an RSRP of the transmission, determining that the RSRP of the transmission is below the RSRP threshold, and transmitting, to the second device, configuration information to configure the second device to transmit a feedback signal based at least in part on one or more conditions.

An apparatus for wireless communication in a wireless communications system is described. The apparatus may include a processor, memory coupled to the processor, the processor and memory configured to receive a transmission comprising data from a second apparatus, measure an RSRP of the transmission, determine that the RSRP of the transmission is below the RSRP threshold, and transmit, to the second apparatus, configuration information to configure the second apparatus to transmit a feedback signal based at least in part on one or more conditions.

Another apparatus for wireless communication in a wireless communications system is described. The apparatus may include means for receiving a transmission comprising data from a second apparatus, means for measuring an RSRP of the transmission, means for determining that the RSRP of the transmission is below the RSRP threshold, and means for transmitting, to the second apparatus, configuration information to configure the second apparatus to transmit a feedback signal based at least in part on one or more conditions.

A non-transitory computer-readable medium storing code for wireless communication at a first device in a wireless communications system is described. The code may include instructions executable by a processor to receive a transmission comprising data from a second apparatus, measure an RSRP of the transmission, determine that the RSRP of the transmission is below the RSRP threshold, and transmit, to the second apparatus, configuration information to configure the second apparatus to transmit a feedback signal based at least in part on one or more conditions.

A method of wireless communications at a receiver device in a wireless communications system is described. The method may include determining a blind retransmission occasion of a packet, determining that the packet includes data satisfying a set of conditions based on the blind retransmission occasion, and transmitting a feedback message relating to the blind retransmission of the packet based on determining that the packet satisfies the set of conditions.

An apparatus for wireless communications in a wireless communications system is described. The apparatus may include a processor, memory coupled to the processor, the processor and memory configured to determine a blind retransmission of a packet, determine that the packet includes data satisfying a set of conditions based on the blind retransmission occasion, and transmit a feedback message relating to the blind retransmission of the packet based on determining that the packet satisfies the set of conditions.

Another apparatus for wireless communications in a wireless communications system is described. The apparatus may include means for determining a blind retransmission occasion of a packet, means for determining that the packet includes data satisfying a set of conditions based on the blind retransmission occasion, and means for transmitting a feedback message relating to the blind retransmission of the packet based on determining that the packet satisfies the set of conditions.

A non-transitory computer-readable medium storing code for wireless communications at a receiver device in a wireless communications system is described. The code may include instructions executable by a processor to determine a blind retransmission occasion of a packet, determine that the packet includes data satisfying a set of conditions based on the blind retransmission occasion, and transmit a feedback message relating to the blind retransmission of the packet based on determining that the packet satisfies the set of conditions.

In some examples of the method, apparatuses, and non-transitory computer-readable medium described herein, for determining that the packet satisfies the set of conditions, may include operations, features, means, or instructions for measuring an RSRP of the packet, and determining that the RSRP of the packet satisfies an RSRP threshold. In some examples of the method, apparatuses, and non-transitory computer-readable medium described herein, transmitting the feedback message may be based on the RSRP of the packet satisfying the RSRP threshold.

Some examples of the method, apparatuses, and non-transitory computer-readable medium described herein may further include operations, features, means, or instructions for determining the RSRP threshold. In some examples of the method, apparatuses, and non-transitory computer-readable medium described herein, determining that the RSRP of the packet satisfies the RSRP threshold is based on determining the RSRP threshold.

Some examples of the method, apparatuses, and non-transitory computer-readable medium described herein may further include operations, features, means, or instructions for determining the RSRP threshold based on an MCS, a priority of the packet, or a QoS of the packet, or a combination thereof.

Some examples of the method, apparatuses, and non-transitory computer-readable medium described herein may further include operations, features, means, or instructions for receiving, from a network device, control signaling including configuration information mapping the RSRP threshold to at least one of a MCS, a priority, or a QoS, or a combination thereof, and determining the RSRP threshold based on the mapping.

Some examples of the method, apparatuses, and non-transitory computer-readable medium described herein may further include operations, features, means, or instructions for receiving, from a transmitter device, control signaling including configuration information including the RSRP threshold and determining the RSRP threshold based on the configuration information.

In some examples of the method, apparatuses, and non-transitory computer-readable medium described herein, the RSRP threshold may be preconfigured.

In some examples of the method, apparatuses, and non-transitory computer-readable medium described herein, for determining that the packet satisfies the set of conditions, may include operations, features, means, or instructions for determining an NLOS condition associated with a transmitter device in wireless communications with the receiver device based on location information of the transmitter device. In some examples of the method, apparatuses, and non-transitory computer-readable medium described herein, location information of the receiver device compared to the location information of the transmitter device, a pathloss estimation between the receiver device and the transmitter device, or a combination thereof. In some examples of the method, apparatuses, and non-transitory computer-readable medium described herein, transmitting the feedback message may be based on the NLOS condition.

In some examples of the method, apparatuses, and non-transitory computer-readable medium described herein, for determining that the packet satisfies the set of conditions, may include operations, features, means, or instructions for determining a blocking condition associated with the receiver device in wireless communications with a transmitter device based on a pathloss estimation between the receiver device and the transmitter device. In some examples of the method, apparatuses, and non-transitory computer-readable medium described herein, the blocking condition includes, a pedestrian, a building, or an obstacle, or a combination thereof blocking the LOS path from the transmitter to the receiver device. In some examples of the method, apparatuses, and non-transitory computer-readable medium described herein, transmitting the feedback message may be based on the blocking condition.

Some examples of the method, apparatuses, and non-transitory computer-readable medium described herein may further include operations, features, means, or instructions for collecting sensor information from a set of sensors of the receiver device, where determining the blocking condition may be further based on the collected sensor information, where the set of sensors includes a camera, a radar, or a lidar, or a combination thereof.

Some examples of the method, apparatuses, and non-transitory computer-readable medium described herein may further include operations, features, means, or instructions for receiving configuration information to configure the receiver device to transmit a second feedback message, where the configuration information includes the set of conditions.

A method of wireless communications at a transmitter device in a wireless communications system is described. The method may include receiving a packet including a feedback message from at least one receiver device in the wireless communications system based on monitoring a feedback channel, determining that the feedback message satisfies a set of conditions, and excluding one or more reserved resources of the transmitter device that overlap with the set of reserved resources corresponding to the feedback message based on the determining.

An apparatus for wireless communications in a wireless communications system is described. The apparatus may include a processor, memory coupled to the processor, the processor and memory configured to receive a packet including a feedback message from at least one receiver device in the wireless communications system based on monitoring a feedback channel, determine that the feedback message satisfies a set of conditions, and exclude one or more reserved resources of the apparatus that overlap with the set of reserved resources corresponding to the feedback message based on the determining.

Another apparatus for wireless communications in a wireless communications system is described. The apparatus may include means for receiving a packet including a feedback message from at least one receiver device in the wireless communications system based on monitoring a feedback channel, means for determining that the feedback message satisfies a set of conditions, and means for excluding one or more reserved resources of the apparatus that overlap with the set of reserved resources corresponding to the feedback message based on the determining.

A non-transitory computer-readable medium storing code for wireless communications at a transmitter device in a wireless communications system is described. The code may include instructions executable by a processor to receive a packet including a feedback message from at least one receiver device in the wireless communications system based on monitoring a feedback channel, determine that the feedback message satisfies a set of conditions, and exclude one or more reserved resources of the transmitter device that overlap with the set of reserved resources corresponding to the feedback message based on the determining.

Some examples of the method, apparatuses, and non-transitory computer-readable medium described herein may further include operations, features, means, or instructions for receiving in a preceding packet an indication of the set of reserved resources corresponding to the feedback message, and determining the set of reserved resources corresponding to the feedback message based on the indication. In some examples of the method, apparatuses, and non-transitory computer-readable medium described herein, excluding the set of reserved resources corresponding to the feedback message may be based on determining the set of reserved resources.

Some examples of the method, apparatuses, and non-transitory computer-readable medium described herein may further include operations, features, means, or instructions for determining a distance between the transmitter device and the at least one receiver device in the wireless communications system, determining that the distance may be greater than or equal to an exclusion distance value of the transmitter device, and determining that exclusion distance value of the transmitter device excludes the set of reserved resources corresponding to the feedback message. In some examples of the method, apparatuses, and non-transitory computer-readable medium described herein, excluding the set of reserved resources corresponding to the feedback message based on the exclusion distance value may be an indication to the at least one receiver device that the set of reserved resources may be available to the at least one receiver device.

In some examples of the method, apparatuses, and non-transitory computer-readable medium described herein, determining that the feedback message satisfies a condition may include operations, features, means, or instructions for measuring an RSRP of the feedback message based on monitoring the feedback channel, and determining that the RSRP of the feedback message satisfies an RSRP threshold. In some examples of the method, apparatuses, and non-transitory computer-readable medium described herein, excluding one or more reserved resources of the transmitter device that overlap with the set of reserved resources of the feedback message may be based on the RSRP of the feedback message satisfying the RSRP threshold. In some examples of the method, apparatuses, and non-transitory computer-readable medium described herein, excluding one or more reserved resources of the transmitter device that overlap with the set of reserved resources corresponding to the feedback message based on the RSRP of the feedback message satisfying the RSRP threshold may be a second indication to the at least one receiver device that the set of reserved resources may be unavailable.

Some examples of the method, apparatuses, and non-transitory computer-readable medium described herein may further include operations, features, means, or instructions for determining the RSRP threshold based on an MCS, a priority of the feedback message, or a QoS of the feedback message, or a combination thereof.

Some examples of the method, apparatuses, and non-transitory computer-readable medium described herein may further include operations, features, means, or instructions for receiving, from a network device, control signaling including configuration information mapping the RSRP threshold to at least one of a MCS, a priority, or a QoS, or a combination thereof, and determining the RSRP threshold based on the mapping.

Some examples of the method, apparatuses, and non-transitory computer-readable medium described herein may further include operations, features, means, or instructions for receiving a second packet including data from the at least one receiver device, measuring an RSRP of the second packet, determining that the RSRP of the second packet may be below the RSRP threshold, and transmitting, to the at least one receiver device, configuration information to configure the at least one receiver device to transmit a second feedback message based on a second set of conditions.

DETAILED DESCRIPTION

Figure 1:
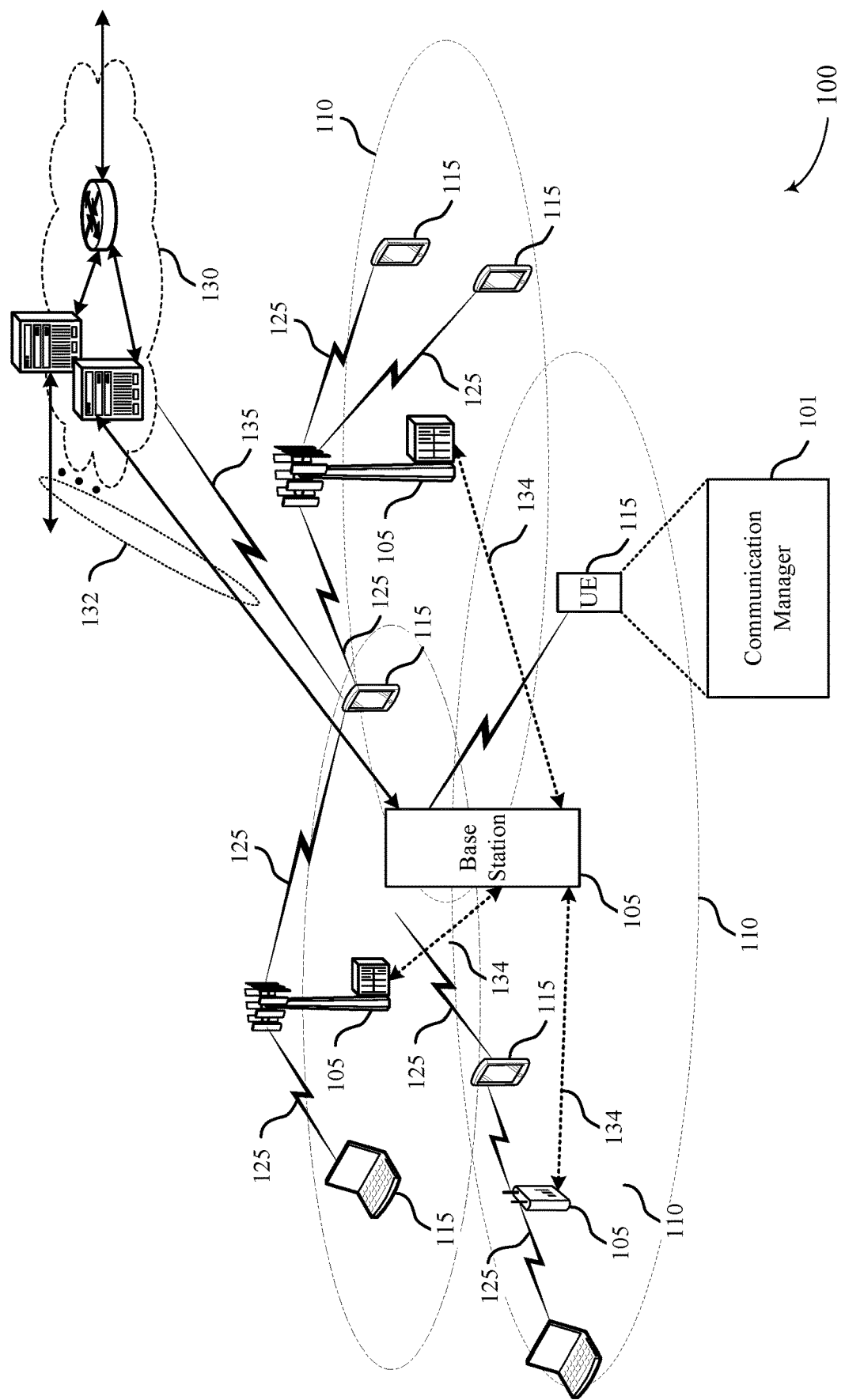
FIGS. 1 and 2 illustrate examples of a wireless communications system in accordance with one or more aspects of the present disclosure.

A UE, in a communications system that supports sidelink communications (e.g., direct communications between multiple UEs), may mitigate or decrease collisions or other interference on resources (e.g., time and frequency resources) used by other UEs. For example, UEs in a sidelink communications system (e.g., D2D networks, V2V networks, C-V2X networks, and the like) may avoid collisions or other interference on resources (e.g., time and frequency resources) used by other UEs. In some examples, UEs may transmit to other UEs, in the sidelink communications system, reservation signals that reserve resources for packet transmission(s). As such, UEs in the sidelink communications system may be aware of reserved resources of other UEs. In some cases, a transmitter UE in a sidelink communications system may decrease or eliminate likely collisions or other interference on reserved resources used by other UEs, for example, by using an exclusion distance value, and the like. The exclusion distance value may be a resource avoidance mechanism for the transmitter UE, such as an indication to refrain from using resources that may overlap with reserved resources by other UEs in the sidelink communications system.

Some resource avoidance mechanism, such as the one outlined above, in the sidelink communications systems may be effective in decreasing interference between UEs when the UEs are in LOS. For example, in a highway sidelink communications environment including multiple UEs, each UE may be in LOS to other UEs. Thereby, a transmitter UE in the highway sidelink communications environment may use the resource avoidance outlined above to refrain from using resources that may overlap with reserved resources by other UEs. Thus, in a highway sidelink communications environment, a transmitter UE may receive signals from other UEs and determine an RSRP of each of the received signals. The transmitter UE may then determine whether the RSRP of each of the received signals satisfies an RSRP threshold. As a result, if an RSRP of a received signal satisfies an RSRP threshold, the transmitter UE may refrain from performing a packet transmission on reserved resources by the other UE. These mechanisms may ensure that other transmitting UEs that use overlapping resources with the transmitter UE will be sufficiently far away from the receiving UE.

In some examples, if all UEs are in LOS with each other, the interference seen at the receiver UE may be controlled. For example, the transmitter UE may determine reserved resources of other UEs based in part on received reservation signals, and distance(s) from the transmitter UE to the other UEs. The transmitter UE may then determine a protection zone (also referred to herein as the exclusion distance value) that may be based in part on a communication range (e.g., of a packet transmission range based in part on a QoS indicator of the packet (e.g., a 5QI), and the like) of the transmitter UE, and determine whether the distance(s) to the other UE(s) is inside or outside the protection zone. As a result, if another UE is within the protection zone, the transmitter UE may refrain from performing a packet transmission on reserved resources by the other UE (i.e., within the protection zone and in LOS to the transmitter UE).

In a highway sidelink communications environment example, for example, V2V communications, three vehicles may be on a same path and in LOS of each other. In this example, a first vehicle (e.g., vehicle B) may not be in a protection zone of a second vehicle (e.g. vehicle A), therefore resources of the first vehicle and the second vehicle may overlap. In some examples, signals transmitted by the first vehicle may pose strong interference (e.g., above a threshold) to a third vehicle (e.g., vehicle C) because their channels may be in LOS. Additionally, signals transmitted by the second vehicle may pose strong interference (e.g., above a threshold) to the third vehicle (e.g., vehicle C), as well because their channels may be in LOS. However, the third vehicle may still decode packet transmissions because a signal-to-noise ratio (SINR) may be high enough (e.g., above a threshold).

In an urban sidelink communications environment example, a transmitter UE may be in an NLOS to other UEs (e.g. receiver UEs). As a result, a receiver UE may be susceptible to interference from the transmitter UE. By way of example, in an urban sidelink communications environment, for example, V2V communications, two vehicles not on a same path (e.g. road) may be in NLOS to each other (e.g., at a crossroad). One of the two vehicles may be a transmitter, while the other vehicle may be a receiver. If the receiver vehicle is not within a protection zone of the transmitter vehicle, packet transmission from the transmitter vehicle may have an interference on the receiver vehicle signaling (e.g., packet transmission). In other examples, because the transmitter vehicle and receiver vehicle are in NLOS signal transmissions from the transmitter vehicle may be weak. However, signal transmissions from another transmitter vehicle that may be on a same path as the receiver vehicle may be strong.

The signal transmission from the other transmitter vehicle may therefore interfere with receiving the signal transmission from the transmitter vehicle (in addition an SINR may also be low). As such, the receiver vehicle may be unable to decode a signal transmission from the transmitter vehicle due to the strong interference from the other transmitter vehicle. It may be advantageous in communications systems that support sidelink communications, such as D2D systems, V2X systems (or other systems such as V2V networks, C-V2X networks), and the like to support a feedback mechanism (e.g., providing original transmitter UE information to improve the communication link (e.g. re transmit, update MCS, transmission mode to reflect channel condition etc.))) for receiver UEs in the communications systems. To support interference avoidance for packet transmissions, a dedicated feedback channel may be used to enable UEs to provide a feedback to other UEs in the communications system(s).

For example, in a V2X system, a packet may be transmitted or retransmitted a number of times. That is, for example, in a V2X multicast system, a retransmission may be based in part on a feedback-based transmission or it can be a blind retransmission (e.g., not conditioned on receiving a feedback). By way of example, a packet can be transmitted $n_{Tx}$ number of times out of which $m_{RTx}$ will be blind retransmissions, and there may be $n_{Tx}$-$m_{RTx}$ feedback-based retransmissions. By way of example, a transmitter UE may transmit an initial packet transmission (or a retransmission) to other UEs in a V2X system. If at least one of the other UEs does not receive the initial packet transmission, the other UEs may transmit a feedback signal (also referred to as a feedback message or a feedback packet) that will trigger a retransmission. Otherwise, there may not be a need for the transmitter UE to send the feedback signal.

Upon receiving the feedback signal, the other UEs may already be aware of reserved resources for a retransmission of the initial packet, and therefore may refrain from using the reserved resources for the retransmission by the transmitter UE. Alternatively, a transmitter may perform a blind retransmission to address half-duplex and control collision (e.g. when a receiver UE cannot detect initial control information, in which case no feedback-message is transmitted by the receiver UE). For a blind retransmission, the transmitting UE may not need to receive any feedback from the receiving UEs. However, to support interference avoidance for packet transmissions by a transmitter UE, a receiver UE may, irrespective of decoding a packet of a blind retransmission by the transmitter UE, transmit a packet including a feedback signal to the transmitter UE and/or other transmitter UEs. As such, the feedback signal transmitted by the receiver UE may serve as a protection beacon for the receiver UE.

According to aspects of the disclosure, in view of a blind retransmission, a receiver UE may transmit a feedback signal, to a transmitter UE (including other UEs in a sidelink communications system) to serve as a protection beacon, based in part on a set of conditions. A set of conditions may include one or more conditions. In other words, a set of conditions may include a single condition or multiple conditions. In some examples, a receiver UE may transmit a packet including a feedback signal, regardless of whether the receiver UE is able of decoding the packet from a transmitter UE, or unless explicitly signaled by the transmitter UE (e.g., a last retransmission indication, or that there are unavailable resources for a retransmission). Thereby, the receiver UE may protect the resources, where the retransmission is expected to happen, from other UEs in the sidelink communications system from inadvertently using the same or overlapping resource and causing interference to the receiver UE. The set of conditions for the feedback signal transmission may improve spatial re-use in the sidelink communications system. In some examples, the set of condition may include, but is not limited to, a packet RSRP satisfying an RSRP threshold, an NLOS condition, a blocking condition, and the like.

According to other aspects of the disclosure, in view of a blind retransmission, a transmitter UE may instruct a receiver UE in a sidelink communications system, for example, such as a V2X system to transmit a feedback signal based in part on the set of conditions, for example, described herein. In some examples, however, the transmitter UE may refrain from instructing the receiver UE to transmit a feedback signal, for example, when it's a last retransmission or if there are no available resources for a retransmission, or when receiver UE does not need protection (e.g., packet only intended for UEs on the same road). The transmitter UE may also, in some examples, perform a blind retransmission regardless of whether it receives any feedback signals from the receiver UE. Additionally, in a sidelink communications system supporting multicast sidelink communications, other transmitter UEs may receive the feedback signal from the receiver UE(s) and determine whether to exclude reserved resources of the receiver UE(s) from one or more candidate resources (or a set of candidate resources, which may include one or more candidate resources) for its own transmissions based in part on a set of conditions. The set of conditions may include an RSRP of a feedback signal, and the like.

Therefore aspects of the disclosure may provide enhancements to the operation of UEs supporting sidelink communications between multiple UEs, such as in a D2D system, a V2X system (or other systems such as V2V networks, C-V2X networks), and the like. For example, by enabling a receiver UE to transmit feedback signals, to a transmitter UE and other transmitter UEs in a sidelink communications system, in response to blind retransmission of packets by a transmitter UE; operational characteristics, such as processor utilization and latency related to packet transmission by the receiver UE may be reduced. That is, by transmitting feedback signals, the receiver UE may protect the reserved resources for the packet transmissions that it intended to receive, thereby improving the reliability of packet reception. Further by configuring a set of conditions (e.g., RSRP threshold(s)) for the feedback signal transmission, the receiver UE may experience added enhancements to the operational characteristics (e.g., decreased resource utilization by avoiding undesirable feedback signal transmissions).

Aspects of the disclosure are initially described in the context of wireless communications systems. Aspects are then described with respect to process flows that support feedback techniques for sidelink communications. Aspects of the disclosure are further illustrated by and described with reference to apparatus diagrams, system diagrams, and flowcharts that relate to feedback techniques for sidelink communications.

FIG. 1 illustrates an example of a wireless communications system 100 in accordance with one or more aspects of the present disclosure. The wireless communications system 100 includes base stations 105, UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. In some examples, the wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other UEs.

The wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to determine (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for determining a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval. In other cases, a smallest scheduling unit of the wireless communications system 100 may be shorter than a subframe or may be dynamically selected (e.g., in bursts of shortened transmission time intervals or in selected component carriers using shortened transmission time intervals). In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to transmission time intervals or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth. For example, the wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter transmission time interval duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A transmission time interval in eCC may consist of one or multiple symbol periods. In some cases, the transmission time interval duration (that is, the number of symbol periods in a transmission time interval) may be variable. The wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some examples of wireless communications system 100 may support sidelink communications (e.g., direct communications between multiple UEs), such as a D2D system, a V2X system (or other systems such as V2V networks, C-V2X networks), and the like. UEs 115 in a D2D system, a V2X system (or other systems such as V2V networks, C-V2X networks), and the like may have a direct connection, which may be a sidelink connection or V2V/V2X connection. One or more UEs 115 may include a communications manager 101 that may manage sidelink communications. For a receiver UE 115, the communications manager 101 may determine blind retransmission of a packet from a transmitter UE, determine that the packet satisfies a set of conditions based in part on the blind retransmission, and transmit a feedback signal relating to the blind retransmission of the packet. The communications manager 101 may receive a transmission including data from a UE 115, measure an RSRP of the transmission, determine that the RSRP of the transmission is below the RSRP threshold, and transmit, to the UE 115, configuration information to configure the UE 115 to transmit a feedback signal based on one or more conditions.

Alternatively, for a transmitter UE 115, the communications manager 101 may receive a packet including a feedback signal from at least one receiver UE 115 in the wireless communications system 100 based in part on monitoring a feedback channel, determine that the feedback signal satisfies one or more conditions, and exclude one or more resources that overlap with one or more reserved resources corresponding to feedback signal. In some examples, for a transmitter UE 115, the communications manager 101 may select one or more resources, receive a feedback signal from a receive UE 115 in the wireless communications system 100 based on monitoring the feedback channel, determine that the feedback signal satisfies one or more conditions, and refrain from transmitting on the one or more resources of the transmitter UE 115 that overlap with the one or more reserved resources based on the determining. In some examples, the communications manager 101 may determine reserved resources corresponding to the feedback signal.

Thus, wireless communications system 100 may provide enhancements to the operation of UEs 115 supporting sidelink communications (e.g., a V2X system (or other systems such as V2V networks, C-V2X networks), and the like). For example, by enabling a receiver UE 115 to transmit feedback signals, to a transmitter UE 115 and other transmitter UEs 115 in the V2X system, in response to blind retransmission of packets by a transmitter UE 115; reliability related to packet reception by the receiver UE 115 may be improved. That is, by transmitting feedback signals, the receiver UE 115 may protect the resources for its own packet receptions, thereby improving reliability of the reception by the receiver UE 115. Further by configuring a set of conditions (e.g., RSRP threshold(s)) for the feedback signal transmission, the receiver UE 115 may experience added enhancements to the operational characteristics (e.g., decreased resource utilization by avoiding undesirable feedback signal transmissions).

Figure 2:
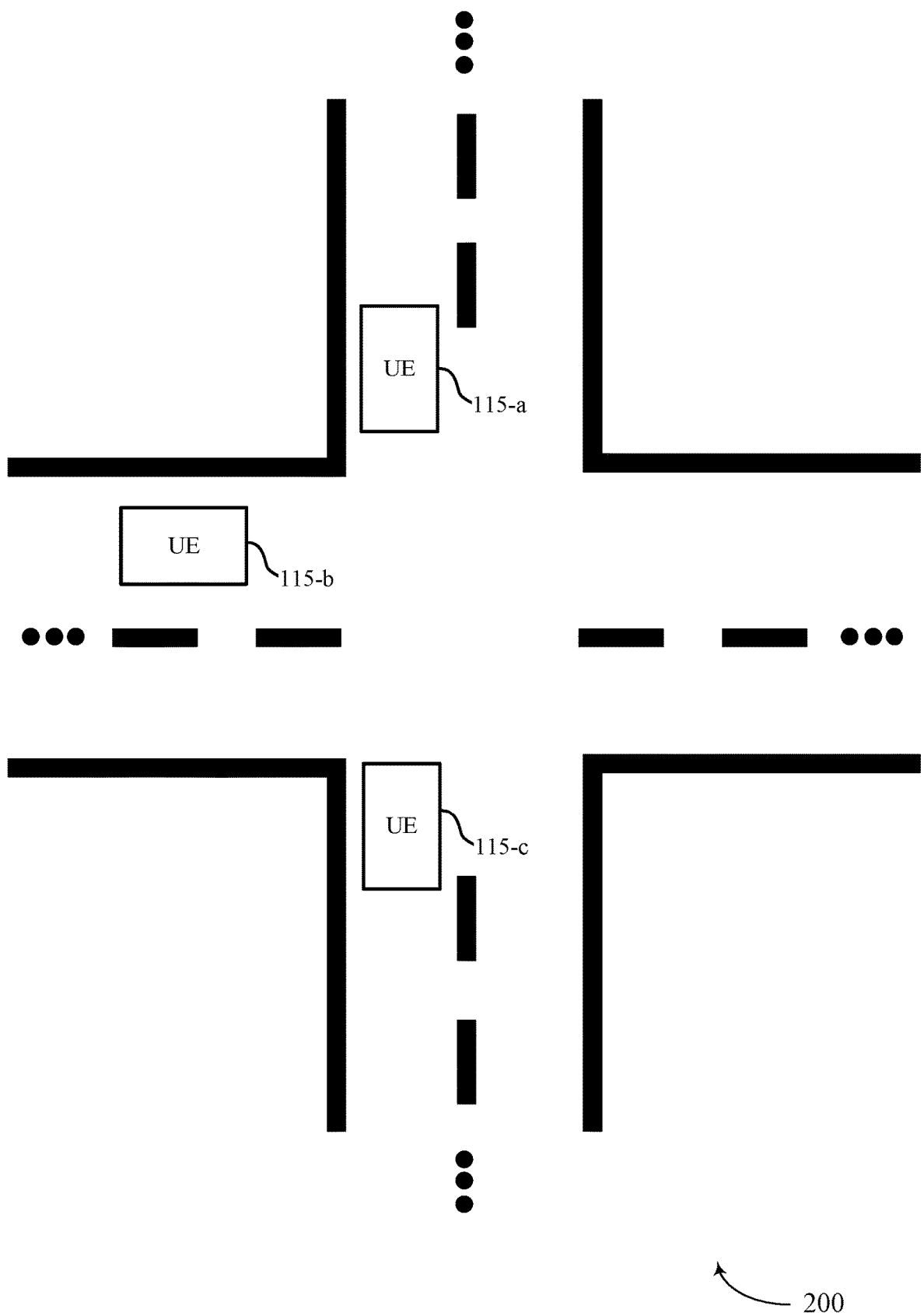

FIG. 2 illustrates an example of a wireless communications system 200 in accordance with one or more aspects of the present disclosure. The wireless communications system 200 may include a UE 115-a, a UE 115-b, and a UE 115-c, which may be examples of the corresponding devices described with reference to FIG. 1. The UE 115-a and the UE 115-b may be referred to herein as a transmitter UE, while the UE 115-c may be referred to herein as a receiver UE. Although the UE 115-a and the UE 115-b are referenced herein as a transmitter UE it should be understood that the UE 115-a and the UE 115-b are capable of both reception and transmission of information (e.g., packets). Similarly, although the UE 115-c is referenced herein as a receiver UE it should be understood that the UE 115-c is capable of both reception and transmission of information. In some examples, the wireless communications system 200 may implement aspects of the wireless communications system 100. For example, the wireless communications system 200 may support interference avoidance by enabling feedback techniques for sidelink communications.

By way of example, UEs 115-a through UE 115-c may determine a packet for transmission. For example, UEs 115-a through UE 115-c may determine one or more packets for transmission to other UEs in the wireless communications system 200 via sidelink communications (e.g., V2X communications). The UEs 115-a through UE 115-c may perform multicast communications in order to maintain accurate system information (vehicle data, scheduled resources, etc.) and construct a resource map for a time-frequency resource pool that is configured for V2X communications. Before a packet transmission, UEs 115-a through UE 115-c may transmit reservation signals that reserve resources for packet transmission(s). As such, UEs 115-a through UE 115-c may be aware of reserved resources of other UEs in the wireless communications system 200.

According to some techniques, a t UE (such as UEs 115-a through UE 115-c) may decrease likely collisions or other interference on reserved resources used by other UEs, for example, by using an exclusion distance value, and the like. The exclusion distance value may be a resource avoidance mechanism for the UEs (such as a transmitter UE 115-a or a transmitter UE 115-b). The exclusion distance value may serve as an indication to the transmitter UE to refrain from using resources that may overlap with one or more reserved resources by other UEs in the wireless communications system 200. Some techniques, such as the one outlined here, may be effective in reducing interference between UEs 115-a through 115-c when these UEs are in LOS.

In a highway V2X environment including multiple UEs, each UE may be in LOS to other UEs. Thereby, a transmitter UE in the highway V2X environment may use the technique outlined above to refrain from using resources that may overlap with reserved resources by other UEs. For example, the transmitter UE 115-*b* may determine reserved resources of other UEs (e.g., other transmitter UE 115-*a*) based in part on received reservation signals, and distance(s) from the transmitter UE 115-*b* to the other UEs (e.g., other transmitter UE 115-*a*). The transmitter UE 115-*b* may then determine an exclusion distance value that may be based in part on a communication range (e.g., of a packet transmission range based in part on a QoS of the packet corresponding to the feedback signal, or a 5QI of the packet corresponding to the feedback signal, and the like), and determine whether the distance(s) to the other UEs (e.g., other transmitter UE 115-*a*) is inside or outside the exclusion distance value. As a result, if the other UE (e.g., other transmitter UE 115-*a*) is within the exclusion distance value of the transmitter UE 115-*b*, the transmitter UE 115-*b* may refrain from a packet transmission on reserved resources by the other UE.

In one example, a transmitter UE may receive signals from other UEs and determine an RSRP of each of the received signals. The transmitter UE may then determine whether the RSRP of each of the received signals satisfies an RSRP threshold. As a result, if an RSRP of a received signal satisfies an RSRP threshold, the transmitter UE may refrain from performing a packet transmission on reserved resources by the other UEs. In another example, a transmitter UE may receive signals from other UEs and determine a distance of between the transmitter UE and the other UEs. The transmitter UE may then determine whether the distance between the transmitter UE and each of the other UEs satisfies a distance exclusion threshold. As a result, if a distance satisfies a distance exclusion threshold, the transmitter UE may refrain from performing a packet transmission on reserved resources by the other UEs. These mechanisms may ensure that other transmitting UEs that use overlapping resources with the transmitter UE will be sufficiently far away from the receiving UE.

In some examples, if all UEs are in LOS with each other, this in turn may ensure that the interference seen at the receiver UE is well controlled. For example in a highway V2X environment example including V2V communications, UE 115-*a* through UE 115-*c* may be three vehicles that may be on a same or different path and in LOS of each other. In this example, a first vehicle (e.g., UE 115-*c*) may not be in a protection zone of a second vehicle (e.g. UE 115-*b*), therefore resources of the first vehicle and the second vehicle may overlap. In some examples, signals transmitted by the first vehicle may pose strong interference (e.g., above a threshold) to a third vehicle (e.g., UE 115-*a*) because their channels may be in LOS. Additionally, signals transmitted by the second vehicle may pose strong interference (e.g., above a threshold) to the third vehicle (e.g., UE 115-*c*), as well because their channels may be in LOS. However, the third vehicle may still decode packet transmissions because an SINR may be high enough (e.g., above a threshold).

Alternatively, in an urban (e.g., residential, commercial) V2X environment, a transmitter UE (e.g., the transmitter UE 115-*b*) may be in a NLOS to other UEs (e.g. receiver UEs, such as receiver UE 115-*c*). As a result, the other UEs (e.g., the receiver UE 115-*c*) may be susceptible to interference from the transmitter UE (e.g., the transmitter UE 115-*b*). By way of example of V2V communications, the transmitter UE 115-*b* and the receiver UE 115-*c* may be in a same neighborhood (or proximate to each other) and may be in NLOS to each other (e.g., a crossroad, traveling on opposite sides of the highway, and the like). If the receiver UE 115-*c* is not within a protection zone of the transmitter UE 115-*b*, packet transmission from the transmitter UE 115-*b* may have an interference on the receiver UE 115-*c* signaling (e.g., packet transmission). That is, if the receiver UE 115-*c* is not within a protection zone of the transmitter UE 115-*b*, packet transmission from the transmitter UE 115-*b* may have an interference on the receiver UE 115-*c* signaling (e.g., packet transmission).

In other examples, because the transmitter UE 115-*b* and receiver UE 115-*c* are in NLOS signal transmissions from the transmitter UE 115-*b* may be weak (e.g., below an RSRP threshold). However, signal transmissions from the other transmitter UE 115-*a* that may be on a same path as the receiver UE 115-*c* may be strong (e.g., above an RSRP threshold). Therefore, the signal transmission from the other transmitter UE 115-*a* may interfere with receiving the signal transmission from the transmitter UE 115-*b*. As such, the receiver UE 115-*c* may be unable to decode a signal transmission from the transmitter UE 115-*b* due to the strong interference from the other transmitter UE 115-*a*. To support interference avoidance for packet transmissions, a dedicated feedback channel may be used to enable UEs 115-*a* through UE 115-*c* to provide a feedback to other UEs in the wireless communications system 200, and more specifically enable receiver UEs (such as the receiver UE 115-*c*) to provide feedback to (other) transmitter UEs in the wireless communications system 200.

In some examples any of UEs 115-*a* through 115-*c* may perform a number of packet transmissions and retransmissions. In the wireless communications system 200, a retransmission may be feedback-based. By way of example, the transmitter UE 115-*b* may transmit an initial packet transmission (or a retransmission) to other UEs (e.g., the other transmitter UE 115-*a* or the receiver UE 115-*c*). If at least one of the other UEs (e.g., the receiver UE 115-*c*), for example due to NLOS, does not receive the initial packet transmission, the other UEs (e.g., the receiver UE 115-*c*) may transmit a feedback signal that may act as a retransmission confirmation for the transmitter UE 115-*b* or a protection beacon for the other transmitter UE 115-*a*. That is, the transmitter UE 115-*b* may initiate a packet transmission (and reserve resources initially), the receiver UE 115-*c* may transmit a feedback signal to confirm the reserved resources, and the transmitter UE 115-*b* may use the received feedback signal as a protection beacon to exclude the resources.

Upon receiving the feedback signal, the transmitter UE 115-*b* may determine to retransmit based on the feedback signal, or determine whether to exclude one or more candidate resources of the other transmitter UE 115-*a*, and therefore may refrain from using resources overlapping with the one or more reserved resources. Alternatively, the transmitter UE 115-*b* may perform a blind retransmission to address half-duplex and control collision (e.g. when a receiver UE 115-*c* cannot detect initial control information, in which case no feedback signal is transmitted by the receiver UE 115-*c*). However, to support interference avoidance for packet transmissions by the transmitter UE 115-*b* (or the other transmitter UE 115-*a*), the receiver UE 115-*c* may, irrespective of decoding a packet of a blind retransmission by the transmitter UE 115-*b*, transmit a feedback signal to the transmitter UE 115-*b* and/or the other transmitter UE 115-*a*. As such, the feedback signal transmitted by the receiver UE 115-*c* may serve as a protection beacon for the receiver UE 115-*c*.

According to aspects of the disclosure, in view of a blind retransmission, the receiver UE 115-c may transmit a feedback signal, to a transmitter UE 115-b and/or the other transmitter UE 115-a (including any other UEs in a V2X system) to serve as a retransmission confirmation, based in part on a set of conditions. The receiver UE 115-c may transmit a feedback signal, regardless of whether there is a request for feedback from the transmitter UE 115-b, or unless explicitly signaled by the transmitter UE 115-b not to send any feedback (e.g., a last retransmission indication, or that there are unavailable resources for a retransmission). Thereby, the receiver UE 115-c may protect the reserved resources where it expects to receive the retransmission from the transmitter UE 115-b in the wireless communications system 200 from inadvertently using the reserved resource and causing interference to the receiver UE 115-c.

By way of example, the receiver UE 115-c may determine a blind retransmission of a packet associated with the transmitter UE 115-b. The receiver UE 115-c may determine that the packet satisfies a set of conditions based in part on the blind retransmission. A set of conditions may include one or more conditions. In other words, a set of conditions may include a single condition or multiple conditions. In an example, the receiver UE 115-c may measure an RSRP of the packet and determine that the measured RSRP satisfies an RSRP threshold (e.g., data RSRP threshold). In some examples, the receiver UE 115-c may determine the RSRP threshold based in part on an MCS, a priority of the packet corresponding to the feedback signal, a QoS of the packet corresponding to the feedback signal, or a 5QI of the packet corresponding to the feedback signal, or a combination thereof. In some examples, the other transmitter UE 115-a may determine an RSRP threshold based in part on the, MCS, the priority of the packet corresponding to the feedback signal, the QoS of the packet corresponding to the feedback signal, or the 5QI of the packet corresponding to the feedback signal, or a combination thereof and include the threshold in control signaling to the receiver UE 115-c, such that the both UEs use the same threshold. Alternatively, the receiver UE 115-c may receive, from a network device (e.g., base station 105 with reference to FIG. 1) control signaling including configuration information mapping the RSRP threshold to at least one of an MCS, a priority of the packet, a QoS of the packet corresponding to the feedback signal, or a 5QI of the packet corresponding to the feedback signal, or a combination thereof. In reply, the receiver UE 115-c may transmit a feedback signal relating to the blind retransmission of the packet based in part on satisfying the set of conditions (e.g., the RSRP threshold).

In other examples, the receiver UE 115-c may determine an NLOS condition associated with the transmitter UE 115-b and/or the other transmitter UE 115-a. The NLOS condition may be determined based in part on location information of the receiver UE 115-c compared to the location information of the transmitter UE 115-b and/or the other transmitter UE 115-a, a pathloss estimation between the receiver UE 115-c and the transmitter UE 115-b and/or the other transmitter UE 115-a, or a combination thereof. The receiver UE 115-c may then transmit a feedback signal relating to the blind retransmission of the packet based in part on determining the NLOS condition. Alternatively, the receiver UE 115-c may determine a blocking condition associated with the receiver UE 115-c the transmitter UE 115-b and/or the other transmitter UE 115-a based in part on a pathloss estimation between the receiver UE 115-c and the transmitter UE 115-b and/or the other transmitter UE 115-a. The blocking condition may include a pedestrian, a building, or an obstacle, or a combination thereof blocking a LOS path from the transmitter UE 115-b and/or the other transmitter UE 115-a to the receiver UE 115-c. The UEs 115-a through 115-c may be configured with a set of sensors to collection information. For example, the receiver UE 115-c may collect sensor information from a set of sensor, which may include at least one of a camera, a motion sensor, a radar, a lidar, and the like to determine an NLOS condition, a blocking condition, and the like.

According to other aspects of the disclosure, in view of a blind retransmission, the transmitter UE 115-b may instruct the receiver UE 115-c to transmit a feedback signal based in part on the set of conditions, for example, described above (e.g., RSRP). In some examples, however, the transmitter UE 115-b may refrain from instructing the receiver UE 115-c to transmit a feedback signal, for example, when performing a last retransmission or if there are no available resources for a retransmission, or when the receiver UE 115-c does not need protection (e.g., packet only intended for UEs on the same road). The transmitter UE 115-b may also, in some examples, perform a blind retransmission regardless of whether it receives any feedback signals from the receiver UE 115-c. Additionally, in supporting multicast sidelink communications, the other transmitter UE 115-a may receive the feedback signal from the receiver UE 115-c and determine whether to exclude one or more candidate resources of the other transmitter UE 115-a, and therefore may refrain from using resources overlapping with the one or more reserved resources. The feedback signal thus may not reserve any new resources, but only confirm the resources reserved by the other transmitter UE 115-a.

For example, the other transmitter UE 115-a may receive a feedback signal from the receiver UE 115-c based in part on monitoring a feedback channel. Although description is given by way of example to a single receiver UE, the other transmitter UE may receive multiple feedback signals from multiple other receiver UEs by monitoring a feedback channel. As part of determining whether to exclude reserved resources of the receiver UE 115-c, the other transmitter UE 115-a may determine whether the feedback signal satisfies a set of conditions. In some examples, the other transmitter UE 115-a may receive in a preceding packet an indication of one or more reserved resources (or a set of reserved resources) corresponding to the feedback signal of the receiver UE 115-c, and determine the set of reserved resources corresponding to the feedback signal based in part on the indication. A set of reserved resources may include one or more reserved resources.

Returning to the determination example, the transmitter UE 115-b (or the other transmitter UE 115-a) may measure an RSRP of the feedback signal and determine that the RSRP of the feedback signal satisfies an RSRP threshold (e.g., feedback RSRP threshold). If the RSRP threshold is satisfied, the transmitter UE 115-b (or the other transmitter UE 115-a) may exclude one or more candidate resources of the other transmitter UE 115-a, and therefore may refrain from using resources overlapping with the one or more reserved resources. In some examples, the transmitter UE 115-b may determine the RSRP threshold based in part on an MCS, a priority of the packet corresponding to the feedback signal, a QoS of the packet corresponding to the feedback signal, or a 5QI of the packet corresponding to the feedback signal, or a combination thereof, and then include the determined RSRP threshold in control signaling.

The receiver UE 115-c may receive information related to the determined RSRP threshold in the control signaling or the feedback signal may replicate that information. Alternatively, in some examples, the transmitter UE 115-*b* (or the other transmitter UE 115-*a*) may determine the RSRP threshold based in part on an MCS, a priority of the packet corresponding to the feedback signal, a QoS of the packet corresponding to the feedback signal, a 5QI of a preceding transmission, or a 5QI of the packet corresponding to the feedback signal, or a combination thereof. Alternatively, the transmitter UE 115-*b* (or the other transmitter UE 115-*a*) may receive, from a network device (e.g., base station 105 with reference to FIG. 1) control signaling including configuration information mapping the RSRP threshold to at least one of an MCS, a priority of the packet corresponding to the feedback signal, a QoS of the packet corresponding to the feedback signal, or a 5QI of the packet corresponding to the feedback signal, or a combination thereof.

In other examples, if the reserved resources are already excluded when the control signaling (e.g., control message) from the transmitter UE 115-*b* (or the other transmitter UE 115-*a*) is received by the receiver UE 115-*c* based on the transmitter UE 115-*b* (or the other transmitter UE 115-*a*) protection radius (i.e., exclusion distance value), the transmitter UE 115-*b* (or the other transmitter UE 115-*a*) may determine whether the feedback signal is received or if the feedback signal is received and is below the RSRP threshold, the transmitter UE 115-*b* (or the other transmitter UE 115-*a*) may not exclude one or more candidate resources of the other transmitter UE 115-*a*, and therefore may still use resources overlapping with the one or more reserved resources.

In some examples, the transmitter UE 115-*b* (or the other transmitter UE 115-*a*) may determine a distance between itself and the receiver UE 115-*c*, and determine that the distance is greater than or equal to an exclusion distance value set by the transmitter UE 115-*b* (or the other transmitter UE 115-*a*). As a result, based on the distance and exclusion distance value, the one or more reserved resources corresponding to the feedback signal are excluded from the transmitter UE 115-*b* (or the other transmitter UE 115-*a*) use. If the reserved resources are not excluded based on the transmitter UE 115-*b* (or the other transmitter UE 115-*a*) protection radius (i.e., exclusion distance value), the transmitter UE 115-*b* (or the other transmitter UE 115-*a*) may evaluate whether other conditions of the set are satisfied, such as the RSRP threshold(s).

Thus, wireless communications system 200 may provide enhancements to the operation of UEs 115-*a* through 115-*c* supporting sidelink communications, such as a V2X system (or other systems such as V2V networks, C-V2X networks), and the like. For example, by enabling the receiver UE 115-*c* to transmit feedback signals, to the transmitter UE 115-*b* and/or the other transmitter UE 115-*a*, in response to blind retransmission of packets by the transmitter UE 115-*b*; the reliability of packet transmission by the other transmitter UE 115-*a* may be improved. That is, by transmitting feedback signals, the receiver UE 115-*c* may protect its reserved resources for its own packet receptions from the other transmitter UE 115-*a* use, thereby increasing the reliability of packet reception from the other transmitter UE 115-*a*. Further by configuring a set of conditions (e.g., RSRP threshold(s)) for the feedback signal transmission, the receiver UE 115-*c* may experience added enhancements to the operational characteristics (e.g., decreased resource utilization by avoiding undesirable feedback signal transmissions).

Figure 3:
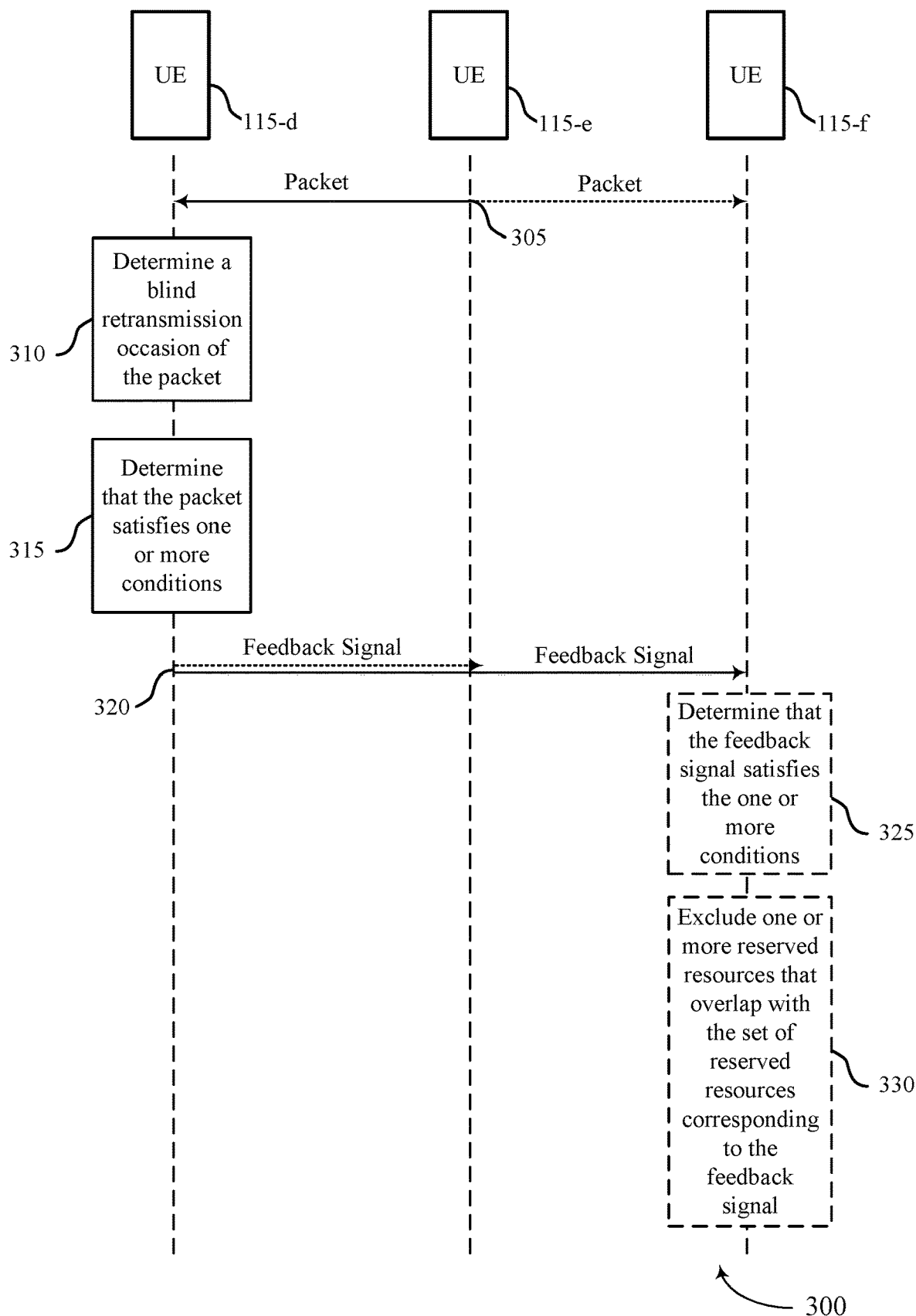
FIG. 3 illustrates an example of a process flow in accordance with one or more aspects of the present disclosure.

FIG. 3 illustrates an example of a process flow 300 in accordance with one or more aspects of the present disclosure. In some examples, the process flow 300 may implement aspects of wireless communications systems 100 or 200. The process flow 300 may include a UE 115-*d*, a UE 115-*e*, and a UE 115-*f* which may be examples of the corresponding devices described with reference to FIGS. 1 and 2. In the following description of the process flow 300, the operations between the UE 115-*d*, the UE 115-*e*, and the UE 115-*f* may be transmitted in a different order than the exemplary order shown, or the operations performed by the UE 115-*d*, the UE 115-*e*, and the UE 115-*f* may be performed in different orders or at different times. Certain operations may also be omitted from the process flow 300, and/or other operations may be added to the process flow 300.

At 305, the UE 115-*e* may transmit a packet to the UE 115-*d*, as well as to the UE 115-*f* (e.g., due to multicast communications). In some examples, the transmission by the UE 115-*e* may be a blind retransmission, as described herein. At 310, the UE 115-*d* may determine a blind retransmission of the packet. At 315, the UE 115-*d* may determine that the packet satisfies one or more conditions. For example, the UE 115-*d* may measure an RSRP of the packet and determine that the RSRP of the packet satisfies an RSRP threshold. In another example, the UE 115-*d* may determine an NLOS condition between the UE 115-*d* and the UE 115-*e* based in part on location information of the UE 115-*d* compared to the location information of the UE 115-*e*, a pathloss estimation between the UE 115-*d* and the UE 115-*d*, or a combination thereof.

In other examples, the UE 115-*d* may determine a blocking condition between the UE 115-*d* and the UE 115-*e* based in part on a pathloss estimation between the UE 115-*d* and the UE 115-*e*. A blocking condition may include for example, vehicle blocking a LOS between the UE 115-*d* and the UE 115-*e*, a pedestrian blocking a LOS between the UE 115-*d* and the UE 115-*e*, a building blocking a LOS between the UE 115-*d* and the UE 115-*e*, or another obstacle blocking a LOS between the UE 115-*d* and the UE 115-*e*, or any combination thereof. The UE 115-*d* may make this determination based in part on collecting sensor information, for example, from a set of sensor local or remote to the UE 115-*d*, such as a radar, a lidar, a camera, and the like. At 320, upon determining that the that the packet satisfies at least one condition of the one or more conditions, the UE 115-*d* may transmit a feedback signal relating to the blind retransmission of the packet to the UE 115-*e* and/or the UE 115-*f*.

At 325, the UE 115-*f* (which may be another transmitter UE) may receive and determine that the feedback signal satisfies of the one or more conditions. For example, the UE 115-*f* may measure an RSRP of the feedback signal, and determine that the RSRP of the feedback signal satisfies an RSRP threshold. The RSRP may be based in part on an MCS, a priority of the packet corresponding to the feedback signal, a QoS of the packet corresponding to the feedback signal, a 5QI of a preceding transmission, or a 5QI of the packet corresponding to the feedback signal, or the like. At 330, the UE 115-*f* may exclude one or more resources that overlap with one or more reserved resources corresponding to the feedback signal. For example, based in part on the feedback signal satisfying at least one condition of the one or more conditions, the UE 115-*f* may exclude one or more resources that overlap with the one or more reserved resources corresponding to the feedback signal. Thereby precluding from causing an interference to the UE 115-*d*.

Figure 4:
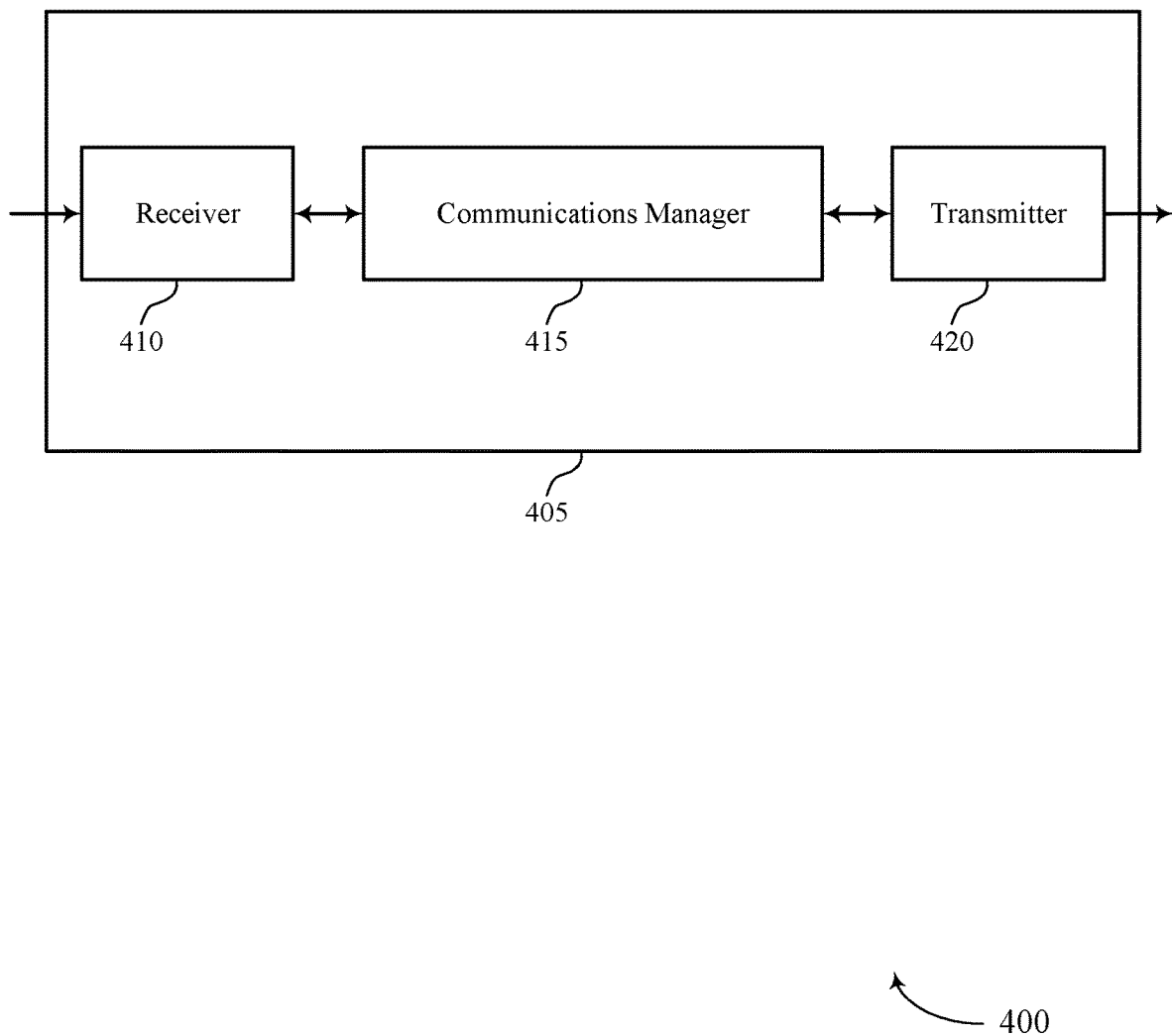
FIGS. 4 and 5 show block diagrams of devices in accordance with one or more aspects of the present disclosure.

FIG. 4 shows a block diagram 400 of a device 405 in accordance with one or more aspects of the present disclosure. The device 405 may be an example of aspects of a device as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to feedback techniques for sidelink communications, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine a blind retransmission of a packet, determine that the packet satisfies one or more conditions based on the blind retransmission, and transmit a feedback signal relating to the blind retransmission of the packet based on determining that the packet satisfies the one or more conditions. The communications manager 415 may also receive a feedback signal from a second device in a wireless communications system based on monitoring a feedback channel, determine that the feedback signal satisfies one or more conditions, and exclude, from one or more candidate resources, one or more resources that overlap with one or more reserved resources corresponding to the feedback signal based on the determining. The communications manager 415 may select one or more resources, receive a feedback signal from a second device in the wireless communications system based on monitoring a feedback channel, determine that the feedback signal satisfies one or more conditions, and refrain from transmitting on the one or more resources that overlap with one or more reserved resources corresponding to the feedback signal based on the determining. The communications manager 415 may receive a transmission including data from a UE 115, measure an RSRP of the transmission, determine that the RSRP of the transmission is below the RSRP threshold, and transmit, to the UE 115, configuration information to configure the UE 115 to transmit a feedback signal based on one or more conditions. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
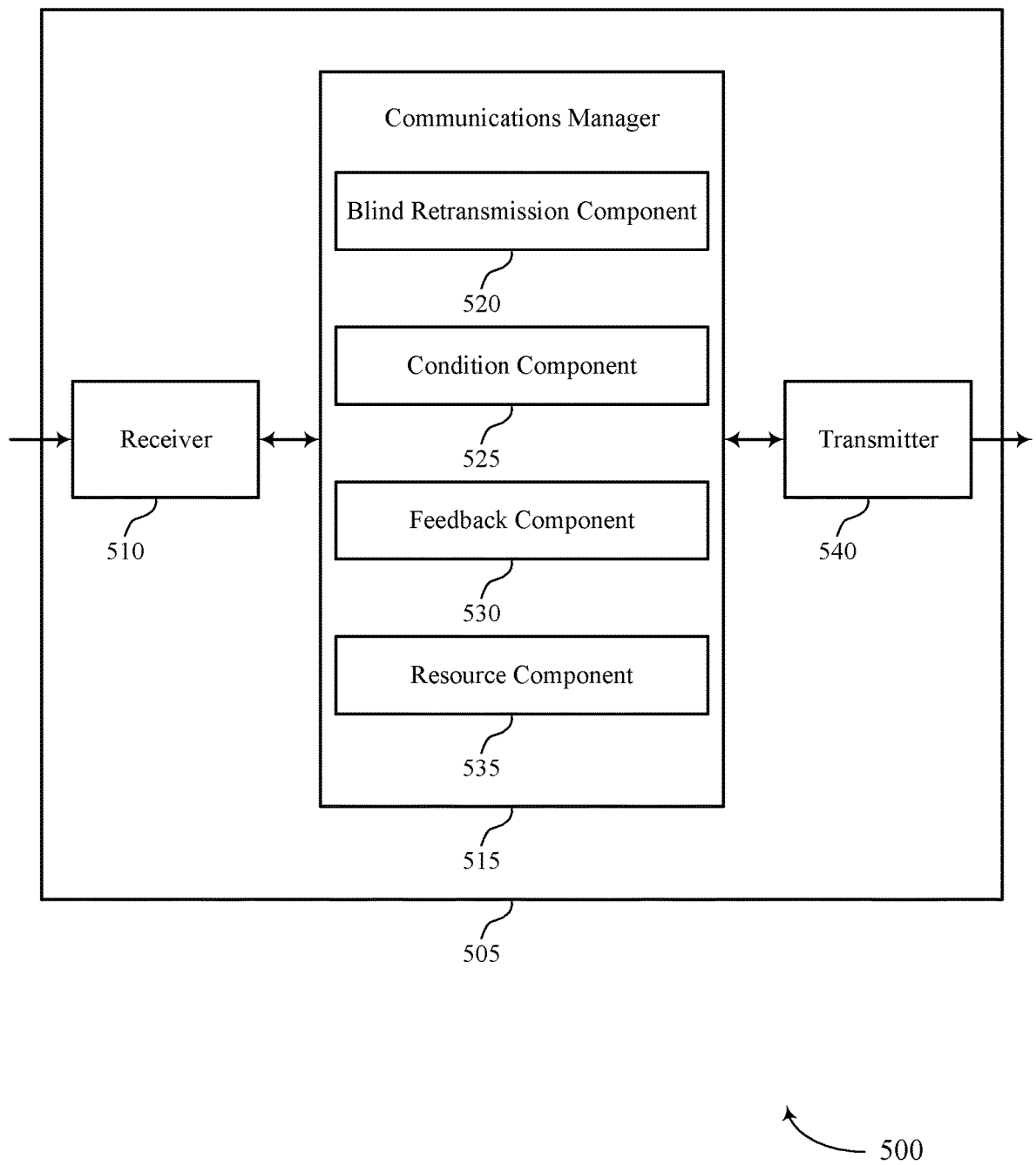

FIG. 5 shows a block diagram 500 of a device 505 in accordance with one or more aspects of the present disclosure. The device 505 may be an example of aspects of a device 405 or a device 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to feedback techniques for sidelink communications, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a blind retransmission component 520, a condition component 525, a feedback component 530, and a resource component 535. The communications manager 515 may be an example of aspects of the communications manager 710 described herein.

The blind retransmission component 520 may determine a blind retransmission of a packet. The condition component 525 may determine that the packet satisfies one or more conditions based on the blind retransmission. The feedback component 530 may transmit a feedback signal relating to the blind retransmission of the packet based on determining that the packet satisfies the one or more conditions. The feedback component 530 may receive a feedback signal from a second device in a wireless communications system based on monitoring a feedback channel. The condition component 525 may determine that the feedback signal satisfies one or more conditions. The resource component 535 may exclude one or more resources that overlap with one or more reserved resources corresponding to the feedback signal based on the determining. The resource component 535 may select one or more resources. The feedback component 530 may receive a feedback signal from a second device in the wireless communications system based on monitoring a feedback channel. The condition component 525 may determine that the feedback signal satisfies one or more conditions. The resource component 535 may refrain from transmitting on the one or more resources that overlap with one or more reserved resources corresponding to the feedback signal based at least in part on the determining.

The transmitter 540 may transmit signals generated by other components of the device 505. In some examples, the transmitter 540 may be collocated with a receiver 510 in a transceiver component. For example, the transmitter 540 may be an example of aspects of the transceiver 720 described with reference to FIG. 7. The transmitter 540 may utilize a single antenna or a set of antennas.

Figure 6:
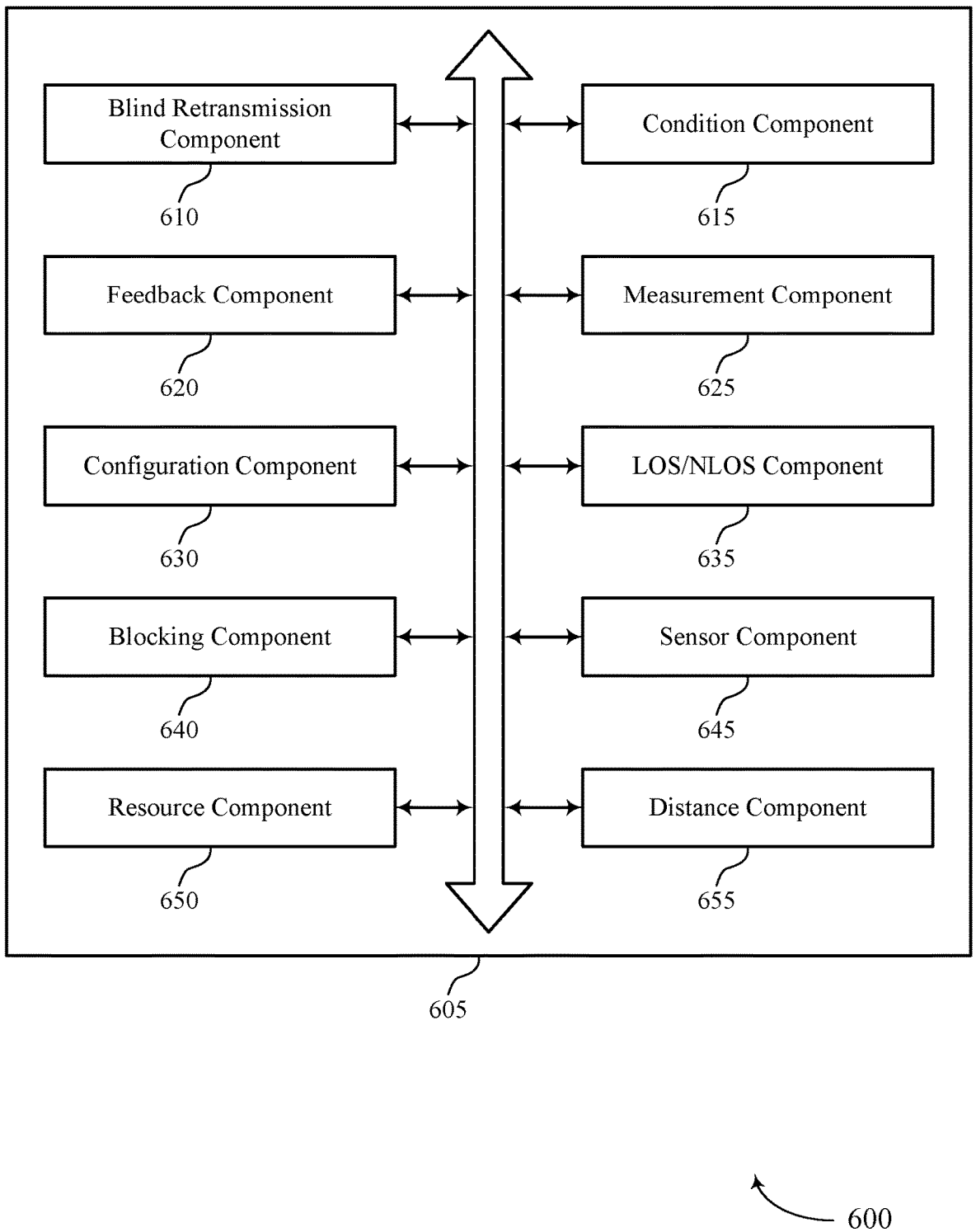
FIG. 6 shows a block diagram of a communications manager in accordance with one or more aspects of the present disclosure.

FIG. 6 shows a block diagram 600 of a communications manager 605 in accordance with one or more aspects of the present disclosure. The communications manager 605 may be an example of aspects of a communications manager 415, a communications manager 515, or a communications manager 710 described herein. The communications manager 605 may include a blind retransmission component 610, a condition component 615, a feedback component 620, a measurement component 625, a configuration component 630, a LOS/NLOS component 635, a blocking component 640, a sensor component 645, a resource component 650, and a distance component 655. Each of these components may communicate, directly or indirectly, with one another (e.g., via one or more buses).

The blind retransmission component 610 may determine a blind retransmission of a packet. The condition component 615 may determine that the packet satisfies one or more conditions based on the blind retransmission. In some examples, the condition component 615 may determine that the feedback signal satisfies one or more conditions. The condition component 615 may determine a hidden node condition associated with a first device in wireless communications with a second device based on an RSRP of the packet, a NLOS condition associated with the second device in wireless communications with the first device, or a blocking condition associated with the first device in wireless communications with the second device, or a combination thereof, where transmitting the feedback signal may be based on the hidden node condition. The condition component 615 may determine that the feedback signal satisfies one or more conditions. The feedback component 620 may transmit a feedback signal relating to the blind retransmission of the packet based on determining that the packet satisfies the one or more conditions. In some examples, the feedback component 620 may receive a feedback signal from a second device (e.g., at least one receiver device) in a wireless communications system based on monitoring a feedback channel.

The resource component 650 may exclude, from one or more candidate resources, one or more resources that overlap with one or more reserved resources corresponding to the feedback signal based on the determining. In some examples, the resource component 650 may receive in a preceding packet an indication of the one or more reserved resources corresponding to the feedback signal. In some examples, the resource component 650 may determine the one or more reserved resources corresponding to the feedback signal based on the indication. In some examples, excluding, from the one or more candidate resources, the one or more resources that overlap with the one or more reserved resources corresponding to the feedback signal may be based on the determined one or more reserved resources. In some examples, refraining from transmitting on the one or more reserved resources may be based on the determined one or more reserved resources corresponding to the feedback signal. The resource component 650 may select one or more resources. The resource component 650 may refrain from transmitting on the one or more resources that overlap with one or more reserved resources corresponding to the feedback signal based on the determining. The resource component 650 may determine the one or more reserved resources corresponding to the feedback signal, where a condition of the one or more conditions includes that the one or more resources overlap the one or more reserved resources corresponding to the feedback signal, and transmit an indication to refrain from transmitting on the one or more reserved resources based on the refraining.

The measurement component 625 may measure the RSRP of the packet. In some examples, the measurement component 625 may determine that the RSRP of the packet satisfies an RSRP threshold, where transmitting the feedback signal may be based on the RSRP of the packet satisfying the RSRP threshold. The measurement component 625 may determine the RSRP threshold, where determining that the RSRP of the packet satisfies the RSRP threshold may be based on the determined RSRP threshold. In some examples, the measurement component 625 may determine the RSRP threshold based on an MCS, a priority of the packet corresponding to the feedback signal, a QoS of the packet corresponding to the feedback signal, or a combination thereof. The RSRP threshold may be preconfigured or configured by a network device, or a combination thereof. In some examples, refraining from transmitting on the one or more resources that overlap with the one or more reserved resources corresponding to the feedback signal may be based on the RSRP of the feedback signal satisfying the RSRP threshold In some examples, the measurement component 625 may measure an RSRP of the feedback signal based on monitoring the feedback channel. The measurement component 625 may determine that the RSRP of the feedback signal satisfies an RSRP threshold, where excluding, from the one or more candidate resources, the one or more resources that overlap with the one or more reserved resources of the feedback signal may be based on the RSRP of the feedback signal satisfying the RSRP threshold. In some examples, the measurement component 625 may determine the RSRP threshold based on an MCS, a priority of the packet corresponding to the feedback signal, a QoS of the packet corresponding to the feedback signal, a 5QI of a preceding transmission, or a 5QI of the packet corresponding to the feedback signal, or a combination thereof. In some examples, the measurement component 625 may receive a transmission from the second device. The measurement component 625 may measure an RSRP of the transmission. The measurement component 625 may determine that the RSRP of the transmission is below the RSRP threshold.

The configuration component 630 may receive, from a network device, control signaling including configuration information mapping the RSRP threshold to at least one of an MCS, a priority of the packet corresponding to the feedback signal, a QoS of the packet corresponding to the feedback signal, or a 5QI of the packet corresponding to the feedback signal, or a combination thereof. In some examples, the configuration component 630 may determine the RSRP threshold based on the mapping. The configuration component 630 may receive, from the second device, control signaling including configuration information including the RSRP threshold, and determine the RSRP threshold based on the configuration information. In some examples, the configuration component 630 may receive configuration information to configure the first device to transmit a second feedback signal, where the configuration information includes the one or more conditions. In some examples, the configuration component 630 may transmit, to the second device, configuration information to configure the second device to transmit a second feedback signal based on one or more additional conditions.

The LOS/NLOS component 635 may determine location information of the second device, and determine an NLOS condition associated with the second device (e.g., a transmitter device) in wireless communications with the first device based on the location information of the second device. The location information of the second device indicates a location of the second device compared to a location of the first device (e.g., a receiver device), a pathloss estimation between the first device and the second device, or a combination thereof, where transmitting the feedback signal may be based on the NLOS condition. The blocking component 640 may determine a blocking condition associated with the first device in wireless communications with the second device (e.g., a transmitter device) based on a pathloss estimation between the first device (e.g., a receiver device) and the second device, where the blocking condition includes, a pedestrian, a building, or an obstacle, or a combination thereof blocking a LOS path from the second device to the first device, where transmitting the feedback signal may be based on the blocking condition.

The sensor component 645 may collect sensor information from a set of sensors of the first device, where determining the blocking condition may be further based on the collected sensor information, where the set of sensors includes a camera, a radar, or a lidar, or a combination thereof. The distance component 655 may determine a distance between the first device (e.g., a transmitter device) and the second device (e.g., a receiver device) in the wireless communications system. In some examples, the distance component 655 may determine that the distance is greater than or equal to an exclusion distance value of the first device. In some examples, the distance component 655 may determine that an exclusion distance value of the second device excludes, from the one or more candidate resources, the one or more resources that overlap with the one or more reserved resources corresponding to the feedback signal.

Figure 7:
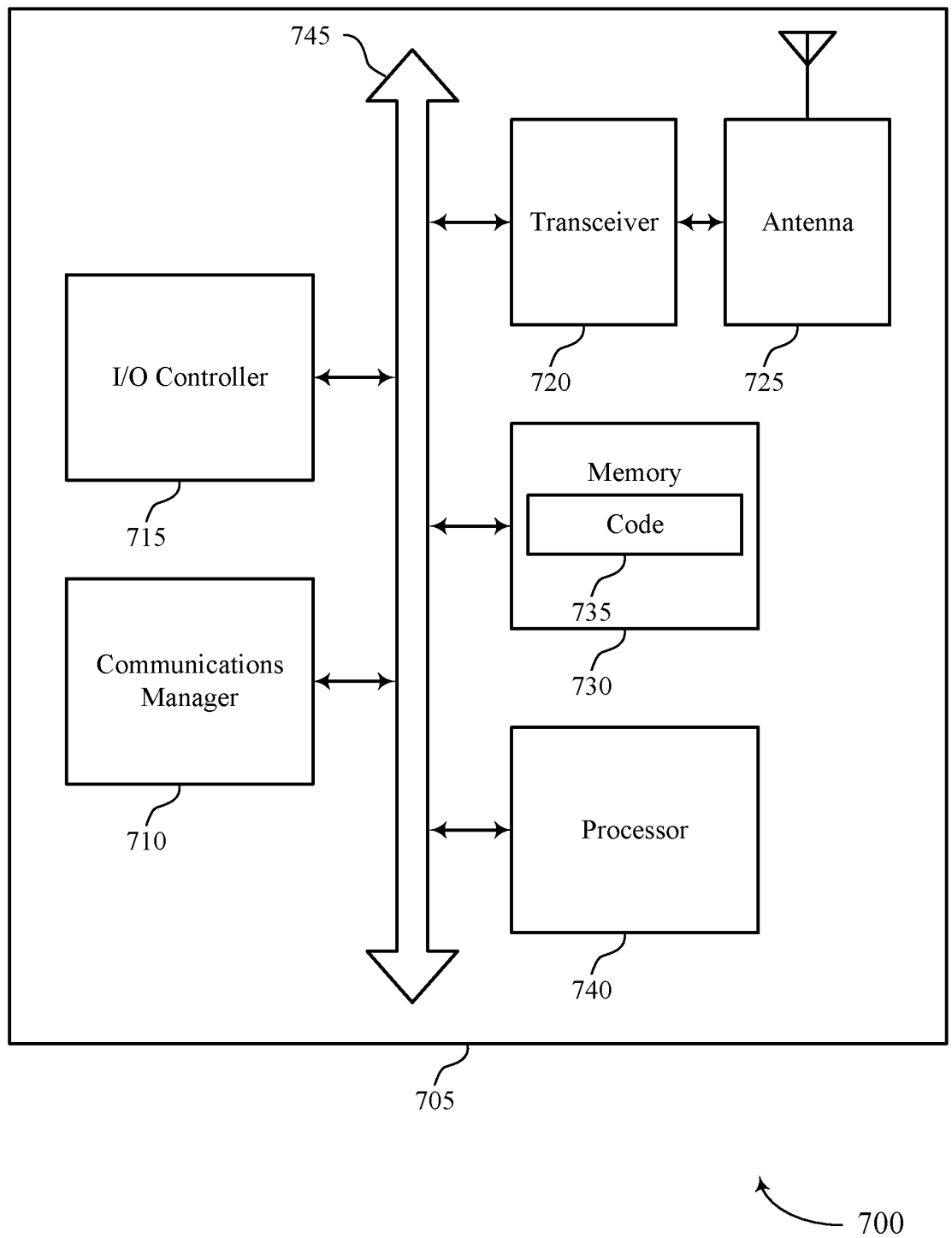
FIG. 7 shows a diagram of a system including a device in accordance with one or more aspects of the present disclosure.

FIG. 7 shows a diagram of a system 700 including a device 705 in accordance with one or more aspects of the present disclosure. The device 705 may be an example of or include the components of device 405, device 505, or a device as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine a blind retransmission of a packet, determine that the packet satisfies one or more conditions based on the blind retransmission, and transmit a feedback signal relating to the blind retransmission of the packet based on the determining. The communications manager 710 may also receive a feedback signal from a second device (e.g., at least one receiver device) based on monitoring a feedback channel, determine that the feedback signal satisfies one or more conditions, and exclude, from the one or more candidate resources, one or more resources that overlap with one or more reserved resources corresponding to the feedback signal based on the determining. The communications manager 710 may select one or more resources, receive a feedback signal from a second device in a wireless communications system based on monitoring a feedback channel, determine that the feedback signal satisfies one or more conditions, and refrain from transmitting on the one or more resources that overlap with one or more reserved resources corresponding to the feedback signal based on the determining.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touch-screen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some examples, the device 705 may include a single antenna 725. However, in some examples the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting feedback techniques for V2X communications).

Figure 8:
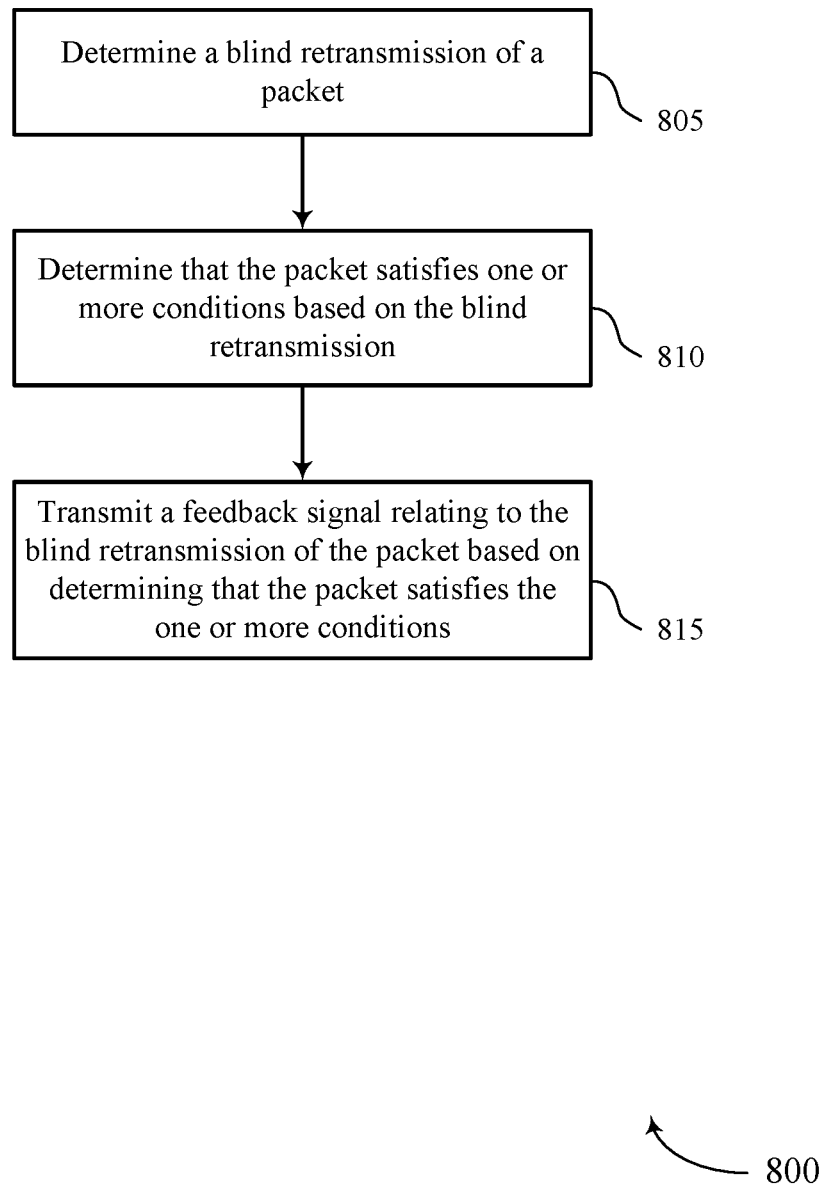
FIGS. 8 through 14 show flowcharts illustrating methods in accordance with one or more aspects of the present disclosure.

FIG. 8 shows a flowchart illustrating a method 800 in accordance with one or more aspects of the present disclosure. The operations of method 800 may be implemented by a device or its components as described herein. For example, the operations of method 800 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 805, the device may determine a blind retransmission of a packet. The operations of 805 may be performed according to the methods described herein. In some examples, aspects of the operations of 805 may be performed by a blind retransmission component as described with reference to FIGS. 4 through 7.

At 810, the device may determine that the packet satisfies one or more conditions based on the blind retransmission. The operations of 810 may be performed according to the methods described herein. In some examples, aspects of the operations of 810 may be performed by a condition component as described with reference to FIGS. 4 through 7.

At 815, the device may transmit a feedback signal relating to the blind retransmission of the packet based on determining that the packet satisfies the one or more conditions. The operations of 815 may be performed according to the methods described herein. In some examples, aspects of the operations of 815 may be performed by a feedback component as described with reference to FIGS. 4 through 7.

Figure 9:
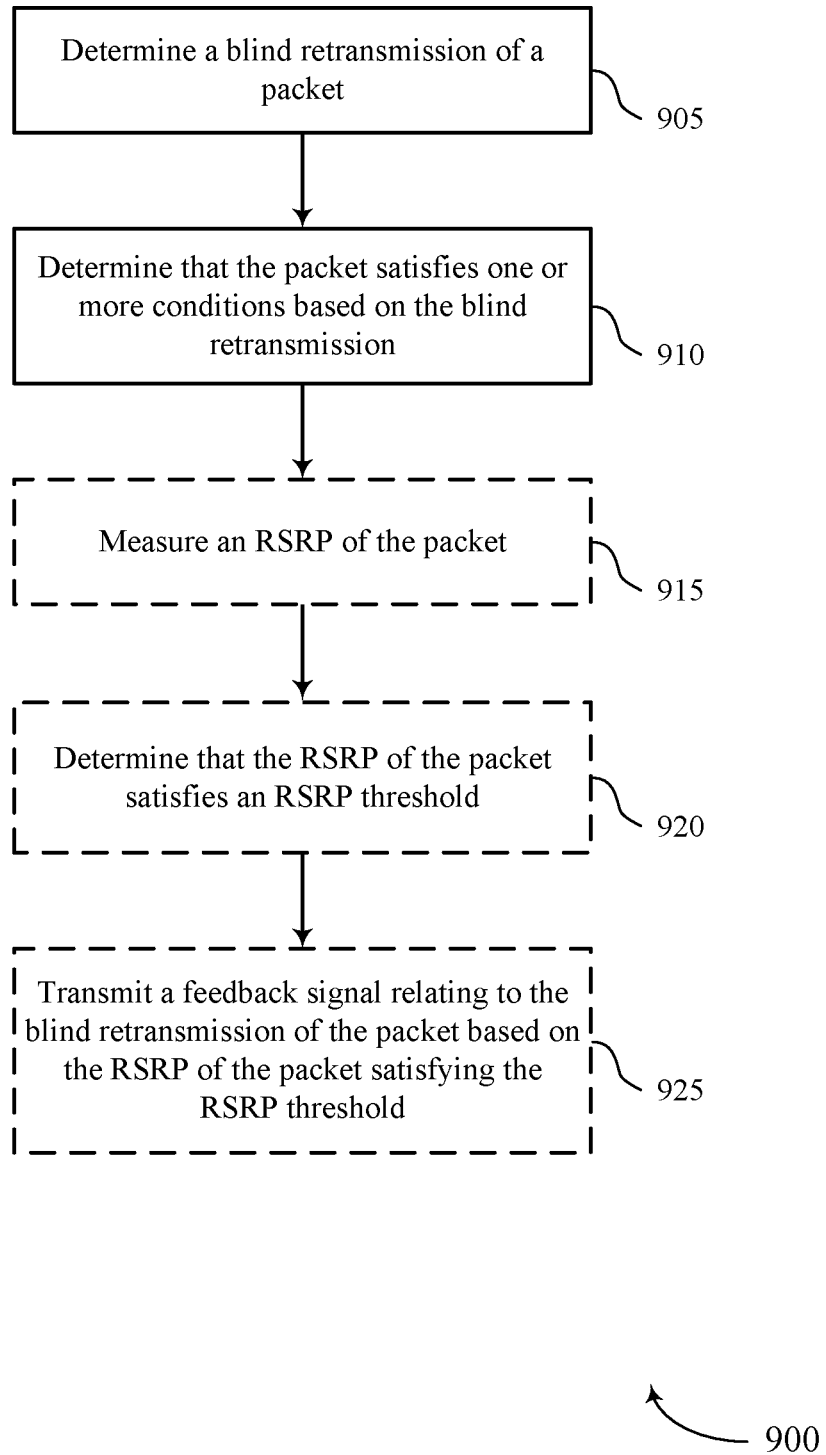

FIG. 9 shows a flowchart illustrating a method 900 in accordance with one or more aspects of the present disclosure. The operations of method 900 may be implemented by a device or its components as described herein. For example, the operations of method 900 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 905, the device may determine a blind retransmission of a packet. The operations of 905 may be performed according to the methods described herein. In some examples, aspects of the operations of 905 may be performed by a blind retransmission component as described with reference to FIGS. 4 through 7.

At 910, the device may determine that the packet satisfies one or more conditions based on the blind retransmission. The operations of 910 may be performed according to the methods described herein. In some examples, aspects of the operations of 910 may be performed by a condition component as described with reference to FIGS. 4 through 7.

At 915, the device may measure an RSRP of the packet. The operations of 915 may be performed according to the methods described herein. In some examples, aspects of the operations of 915 may be performed by a measurement component as described with reference to FIGS. 4 through 7.

At 920, the device may determine that the RSRP of the packet satisfies an RSRP threshold. In some examples, transmitting a feedback signal may be based on the RSRP of the packet satisfying the RSRP threshold. The operations of 920 may be performed according to the methods described herein. In some examples, aspects of the operations of 920 may be performed by a measurement component as described with reference to FIGS. 4 through 7.

At 925, the device may transmit a feedback signal relating to the blind retransmission of the packet based on the RSRP of the packet satisfying the RSRP threshold. The operations of 925 may be performed according to the methods described herein. In some examples, aspects of the operations of 925 may be performed by a feedback component as described with reference to FIGS. 4 through 7.

Figure 10:
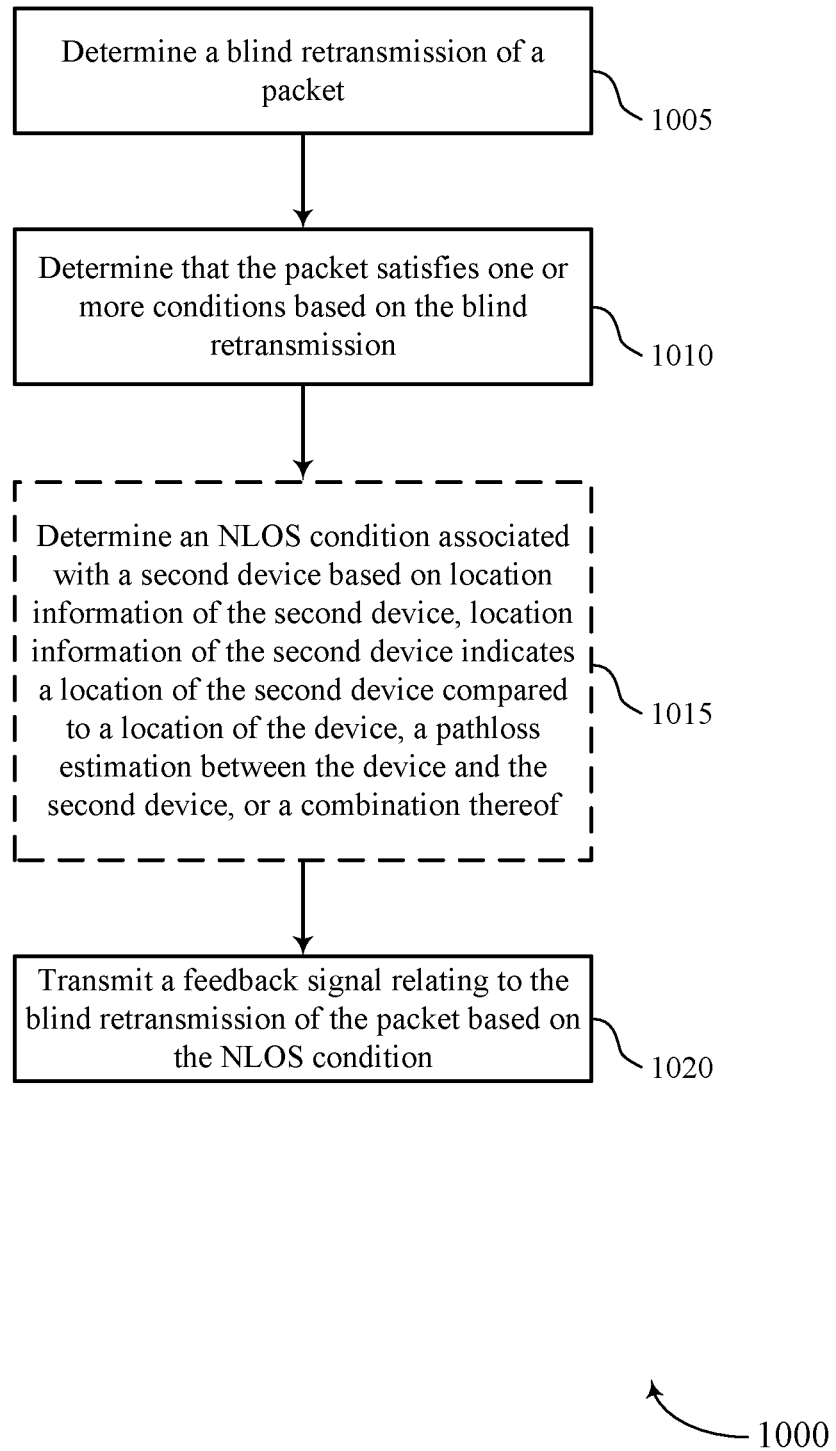

FIG. 10 shows a flowchart illustrating a method 1000 in accordance with one or more aspects of the present disclosure. The operations of method 1000 may be implemented by a device or its components as described herein. For example, the operations of method 1000 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1005, the device may determine a blind retransmission of a packet. The operations of 1005 may be performed according to the methods described herein. In some examples, aspects of the operations of 1005 may be performed by a blind retransmission component as described with reference to FIGS. 4 through 7.

At 1010, the device may determine that the packet satisfies one or more conditions based on the blind retransmission. The operations of 1010 may be performed according to the methods described herein. In some examples, aspects of the operations of 1010 may be performed by a condition component as described with reference to FIGS. 4 through 7.

At 1015, the device may determine an NLOS condition associated with a second device based on location information of the second device, location information of the second device indicates a location of the second device compared to a location of the device, a pathloss estimation between the device and the second device, or a combination thereof. The operations of 1015 may be performed according to the methods described herein. In some examples, aspects of the operations of 1015 may be performed by a LOS/NLOS component as described with reference to FIGS. 4 through 7.

At 1020, the device may transmit a feedback signal relating to the blind retransmission of the packet based on the NLOS condition. The operations of 1020 may be performed according to the methods described herein. In some examples, aspects of the operations of 1020 may be performed by a feedback component as described with reference to FIGS. 4 through 7.

Figure 11:
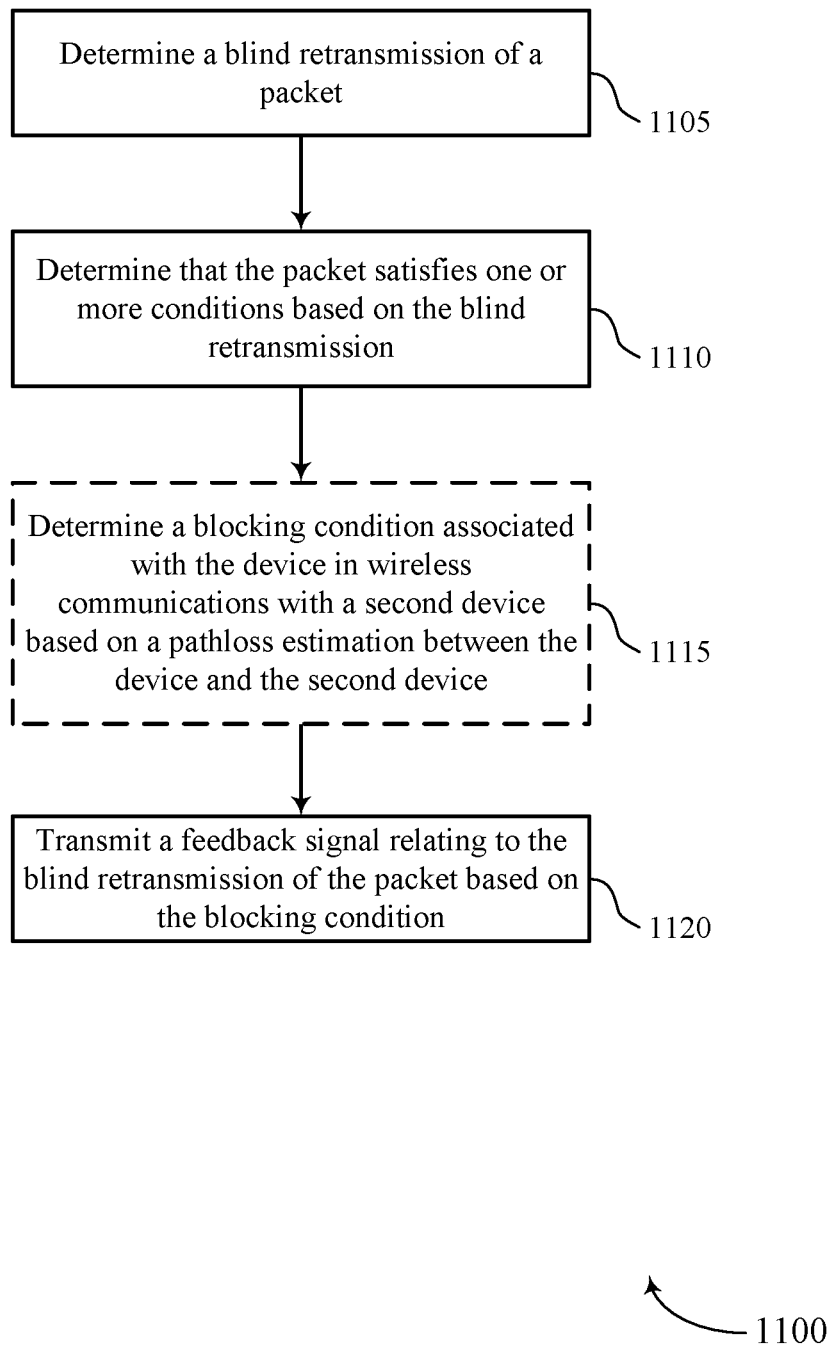

FIG. 11 shows a flowchart illustrating a method 1100 in accordance with one or more aspects of the present disclosure. The operations of method 1100 may be implemented by a device or its components as described herein. For example, the operations of method 1100 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1105, the device may determine a blind retransmission of a packet. The operations of 1105 may be performed according to the methods described herein. In some examples, aspects of the operations of 1105 may be performed by a blind retransmission component as described with reference to FIGS. 4 through 7.

At 1110, the device may determine that the packet satisfies one or more conditions based on the blind retransmission. The operations of 1110 may be performed according to the methods described herein. In some examples, aspects of the operations of 1110 may be performed by a condition component as described with reference to FIGS. 4 through 7.

At 1115, the device may determine a blocking condition associated with the device in wireless communications with a second device based on a pathloss estimation between the device and the second device. In some examples, the blocking condition may include: a pedestrian, a building, or an obstacle, or a combination thereof blocking a LOS path from the transmitter device to the device. The operations of 1115 may be performed according to the methods described herein. In some examples, aspects of the operations of 1115 may be performed by a blocking component as described with reference to FIGS. 4 through 7.

At 1120, the device may transmit a feedback signal relating to the blind retransmission of the packet based on the blocking condition. The operations of 1120 may be performed according to the methods described herein. In some examples, aspects of the operations of 1120 may be performed by a feedback component as described with reference to FIGS. 4 through 7.

Figure 12:
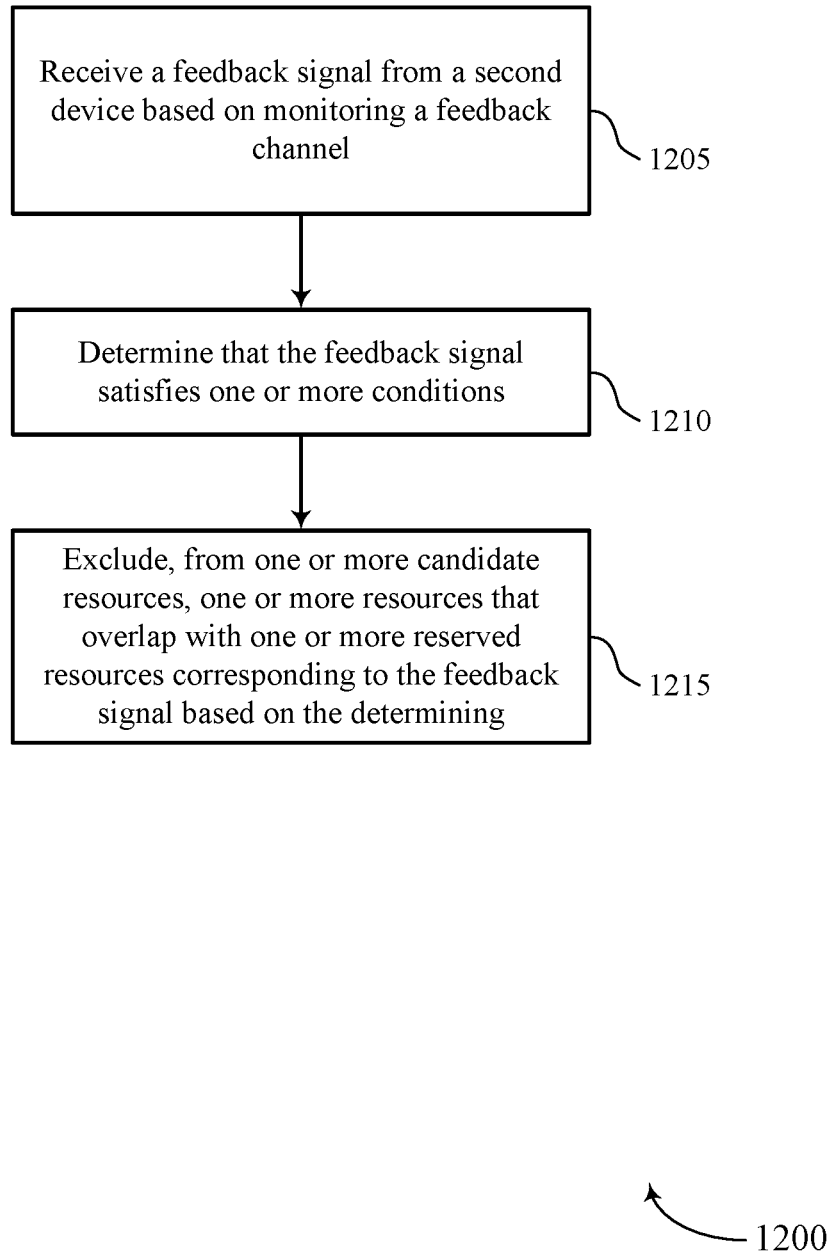

FIG. 12 shows a flowchart illustrating a method 1200 in accordance with one or more aspects of the present disclosure. The operations of method 1200 may be implemented by a device or its components as described herein. For example, the operations of method 1200 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1205, the device may receive a feedback signal from a second device based on monitoring a feedback channel. The operations of 1205 may be performed according to the methods described herein. In some examples, aspects of the operations of 1205 may be performed by a feedback component as described with reference to FIGS. 4 through 7.

At 1210, the device may determine that the feedback signal satisfies one or more conditions. The operations of 1210 may be performed according to the methods described herein. In some examples, aspects of the operations of 1210 may be performed by a condition component as described with reference to FIGS. 4 through 7.

At 1215, the device may exclude, from one or more candidate resources, one or more resources that overlap with one or more reserved resources corresponding to the feedback signal based on the determining. The operations of 1215 may be performed according to the methods described herein. In some examples, aspects of the operations of 1215 may be performed by a resource component as described with reference to FIGS. 4 through 7.

Figure 13:
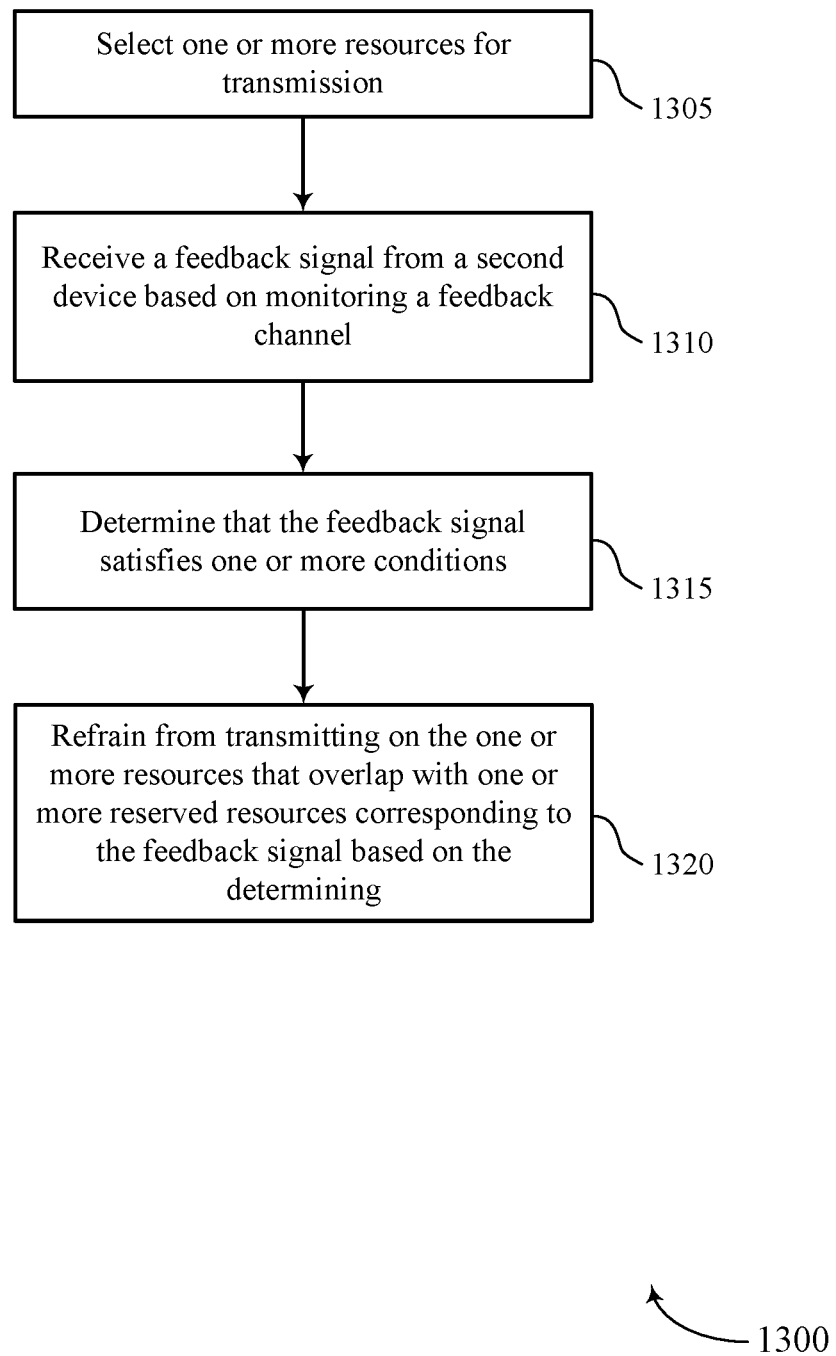

FIG. 13 shows a flowchart illustrating a method 1300 in accordance with one or more aspects of the present disclosure. The operations of method 1300 may be implemented by a device or its components as described herein. For example, the operations of method 1300 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1305, the device may select one or more resources for transmission. The operations of 1305 may be performed according to the methods described herein. In some examples, aspects of the operations of 1305 may be performed by a resource component as described with reference to FIGS. 4 through 7.

At 1310, the device may receive a feedback signal from a second device based on monitoring a feedback channel. The operations of 1310 may be performed according to the methods described herein. In some examples, aspects of the operations of 1310 may be performed by a feedback component as described with reference to FIGS. 4 through 7.

At 1315, the device may determine that the feedback signal satisfies one or more conditions. The operations of 1315 may be performed according to the methods described herein. In some examples, aspects of the operations of 1315 may be performed by a condition component as described with reference to FIGS. 4 through 7.

At 1320, the device may refrain from transmitting on the one or more resources that overlap with one or more reserved resources corresponding to the feedback signal based on the determining. The operations of 1320 may be performed according to the methods described herein. In some examples, aspects of the operations of 1320 may be performed by a condition component as described with reference to FIGS. 4 through 7.

Figure 14:
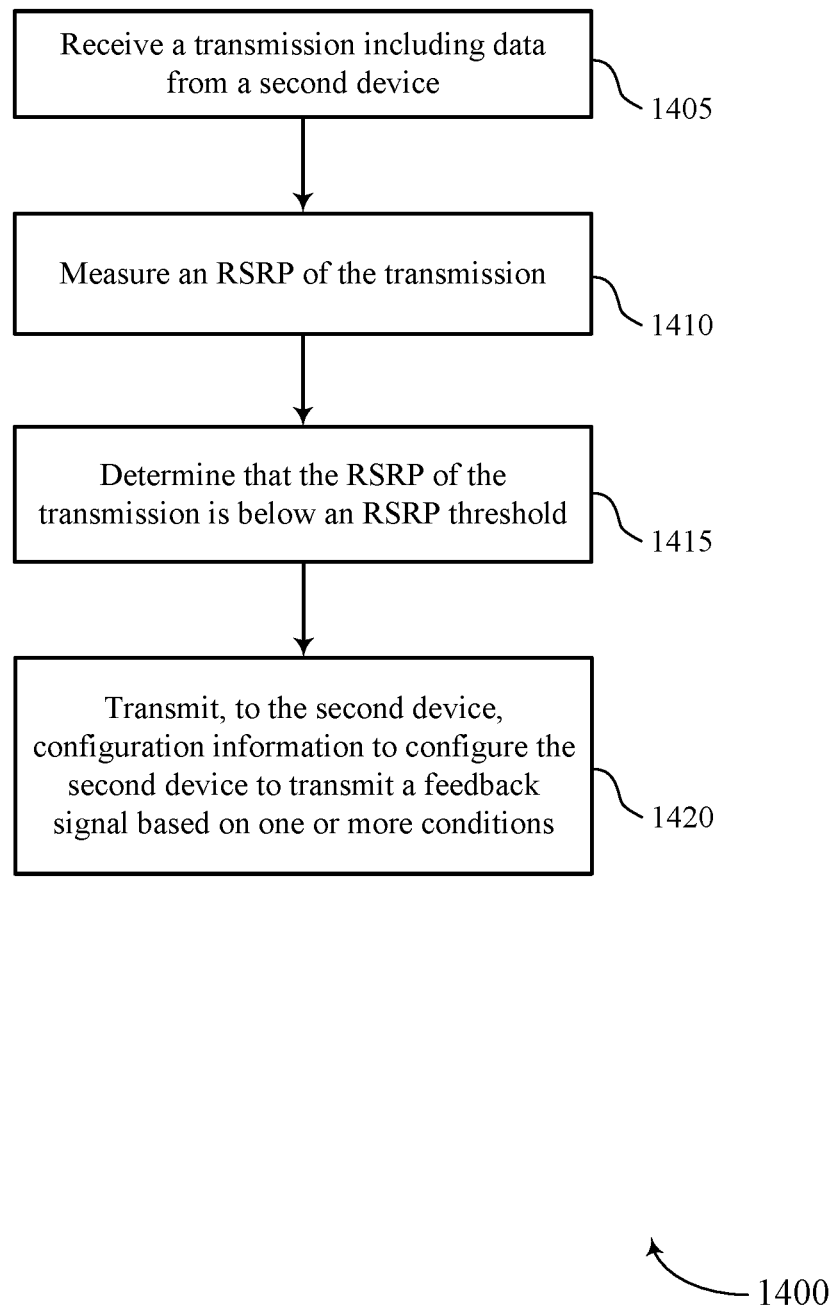

FIG. 14 shows a flowchart illustrating a method 1400 in accordance with one or more aspects of the present disclosure. The operations of method 1400 may be implemented by a device or its components as described herein. For example, the operations of method 1400 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1405, the device may receive a transmission including data from a second device. The operations of 1405 may be performed according to the methods described herein. In some examples, aspects of the operations of 1405 may be performed by a resource component as described with reference to FIGS. 4 through 7.

At 1410, the device may measure an RSRP of the transmission. The operations of 1410 may be performed according to the methods described herein. In some examples, aspects of the operations of 1410 may be performed by a measurement component as described with reference to FIGS. 4 through 7.

At 1415, the device may determine that the RSRP of the transmission is below an RSRP threshold. The operations of 1415 may be performed according to the methods described herein. In some examples, aspects of the operations of 1415 may be performed by a measurement component as described with reference to FIGS. 4 through 7.

At 1420, the device may transmit, to the second device, configuration information to configure the second device to transmit a feedback signal based on one or more conditions. The operations of 1420 may be performed according to the methods described herein. In some examples, aspects of the operations of 1420 may be performed by a configuration component as described with reference to FIGS. 4 through 7.

Example 1

A method for wireless communications at a first device in a wireless communications system, comprising: determining a blind retransmission of a packet; determining that the packet satisfies one or more conditions based at least in part on the blind retransmission; and transmitting a feedback signal relating to the blind retransmission of the packet based at least in part on determining that the packet satisfies the one or more conditions.

Example 2

The method of example 1, wherein determining that the packet satisfies the one or more conditions comprises: determining a hidden node condition associated with the first device in wireless communications with a second device based at least in part on an RSRP of the packet, a non-line of sight condition associated with the second device in wireless communications with the first device, or a blocking condition associated with the first device in wireless communications with the second device, or a combination thereof, wherein transmitting the feedback signal is based at least in part on the hidden node condition.

Example 3

The method of any of examples 1 or 2, further comprising: measuring the RSRP of the packet; and determining that the RSRP of the packet satisfies an RSRP threshold, wherein transmitting the feedback signal is based at least in part on the RSRP of the packet satisfying the RSRP threshold.

Example 4

The method of any of examples 1 to 3, further comprising: determining the RSRP threshold, wherein determining that the RSRP of the packet satisfies the RSRP threshold is based at least in part on the determined RSRP threshold.

Example 5

The method of any of examples 1 to 4, further comprising: determining the RSRP threshold based at least in part on an MCS, a priority of the packet corresponding to the feedback signal, a QoS of the packet corresponding to the feedback signal, or a 5QI of the packet corresponding to the feedback signal, or a combination thereof.

Example 6

The method of any of examples 1 to 5, further comprising: receiving, from a network device, control signaling comprising configuration information mapping the RSRP threshold to at least one of an MCS, a priority of the packet corresponding to the feedback signal, a QoS of the packet corresponding to the feedback signal, or a 5QI of the packet corresponding to the feedback signal, or a combination thereof; and determining the RSRP threshold based at least in part on the mapping.

Example 7

The method of any of examples 1 to 6, further comprising: receiving, from the second device, control signaling comprising configuration information comprising the RSRP threshold; and determining the RSRP threshold based at least in part on the configuration information.

Example 8

The method of any of examples 1 to 7, wherein the RSRP threshold is preconfigured or configured by a network device, or a combination thereof.

Example 9

The method of any of examples 1 to 8, further comprising: determining location information of the second device; and determining the non-line of sight condition associated with the second device in wireless communications with the first device based at least in part on the location information of the second device, wherein location information of the second device indicates a location of the second device compared to a location of the first device, a pathloss estimation between the first device and the second device, or a combination thereof, wherein transmitting the feedback signal is based at least in part on the non-line of sight condition.

Example 10

The method of any of examples 1 to 9, wherein determining that the packet satisfies the one or more conditions comprises: determining a blocking condition associated with the first device in wireless communications with a second device based at least in part on a pathloss estimation between the first device and the second device, wherein the blocking condition comprises, a pedestrian, a building, or an obstacle, or a combination thereof blocking a line of sight path from the second device to the first device, wherein transmitting the feedback signal is based at least in part on the blocking condition.

Example 11

The method of any of examples 1 to 10, further comprising: collecting sensor information from a set of sensors of the first device, wherein determining the blocking condition is further based at least in part on the collected sensor information, wherein the set of sensors comprises a camera, a radar, or a lidar, or a combination thereof.

Example 12

The method of any of examples 1 to 11, further comprising: receiving configuration information to configure the first device to transmit a second feedback signal, wherein the configuration information comprises the one or more conditions.

Example 13

The method of any of examples 1 to 12, wherein the wireless communications comprises sidelink communications.

Example 14

The method of any of examples 1 to 13, wherein the sidelink communications comprises vehicle-to-everything communications.

Example 15

The method of any of examples 1 to 14, further comprising: receiving configuration information to configure the first device to transmit a second feedback signal based at least in part on the one or more conditions.

Example 16

A method for wireless communications at a first device in a wireless communications system, comprising: receiving a packet comprising a feedback signal from a second device in the wireless communications system based at least in part on monitoring a feedback channel; determining that the feedback signal satisfies one or more conditions; and excluding, from one or more candidate resources, one or more resources that overlap with one or more reserved resources corresponding to the feedback signal based at least in part on the determining.

Example 17

The method of example 16, further comprising: receiving in a preceding packet an indication of the one or more reserved resources corresponding to the feedback signal; and determining the one or more reserved resources corresponding to the feedback signal based at least in part on the indication, wherein excluding, from the one or more candidate resources the one or more resources that overlap with the one or more reserved resources corresponding to the feedback signal is based at least in part on the determined one or more reserved resources.

Example 18

The method of example 16 or 17, wherein determining that the feedback signal satisfies the one or more conditions comprises: measuring an RSRP of the feedback signal based at least in part on monitoring the feedback channel; and determining that the RSRP of the feedback signal satisfies an RSRP threshold, wherein excluding, from the one or more candidate resources, the one or more resources that overlap with the one or more reserved resources of the feedback signal is based at least in part on the RSRP of the feedback signal satisfying the RSRP threshold.

Example 19

The method of any of examples 16 to 18, further comprising: determining the RSRP threshold based at least in part on an MCS, a priority of the packet corresponding to the feedback signal, a QoS of the packet corresponding to the feedback signal a 5QI of a preceding transmission, or a 5QI of the packet corresponding to the feedback signal, or a combination thereof.

Example 20

The method of any of examples 16 to 19, further comprising: receiving, from a network device, control signaling comprising configuration information mapping the RSRP threshold to at least one of an MCS, a priority of the packet corresponding to the feedback signal, a QoS of the packet corresponding to the feedback signal, or a 5QI of the packet corresponding to the feedback signal, or a combination thereof.

Example 21

The method of any of examples 16 to 20, further comprising: determining the reference signal received power threshold based at least in part on the mapping.

Example 22

The method of any of examples 16 to 21, wherein determining that the feedback signal satisfies the one or more conditions comprises: determining a distance between the first device and the second device in the wireless communications system; determining that the distance is greater than or equal to an exclusion distance value of the first device; and determining that an exclusion distance value of the second device excludes, from the one or more candidate resources, the one or more resources that overlap with the one or more reserved resources corresponding to the feedback signal.

Example 23

A method for wireless communications at a first device in a wireless communications system, comprising: selecting one or more resources; receiving a packet comprising a feedback signal from a second device in the wireless communications system based at least in part on monitoring a feedback channel; determining that the feedback signal satisfies one or more conditions; and refraining from transmitting on the one or more resources that overlap with one or more reserved resources corresponding to the feedback signal based at least in part on the determining.

Example 24

The method of example 23, further comprising: determining the one or more reserved resources corresponding to the feedback signal, wherein a condition of the one or more conditions comprises that the one or more resources overlap the one or more reserved resources corresponding to the feedback signal; and transmitting an indication to refrain from transmitting the one or more reserved resources based on the refraining.

Example 25

The method of example 23 or 24, further comprising: receiving in a preceding packet an indication of the one or more reserved resources corresponding to the feedback signal; and determining the one or more reserved resources corresponding to the feedback signal based at least in part on the indication, wherein refraining from transmitting on the one or more reserved resources is based at least in part on the determined one or more reserved resources corresponding to the feedback signal.

Example 26

The method of any of examples 23 to 25, wherein determining that the feedback signal satisfies the one or more conditions comprises: measuring an RSRP of the feedback signal based at least in part on monitoring the feedback channel; and determining that the RSRP of the feedback signal satisfies an RSRP threshold, wherein refraining from transmitting on the one or more reserved resources that overlap with the one or more reserved resources corresponding to the feedback signal is based at least in part on the RSRP of the feedback signal satisfying the RSRP threshold.

Example 27

The method of any of examples 23 to 26, further comprising: determining the RSRP threshold based at least in part on an MCS, a priority of the packet corresponding to the feedback signal, a QoS of the packet corresponding to the feedback signal, a 5QI of a preceding transmission, or a 5QI of the packet corresponding to the feedback signal, or a combination thereof.

Example 28

The method of any of examples 23 to 27, further comprising: receiving, from a network device, control signaling comprising configuration information mapping the RSRP threshold to at least one of an MCS, a priority of the packet corresponding to the feedback signal, a QoS of the packet corresponding to the feedback signal, or a 5QI of the packet corresponding to the feedback signal, or a combination thereof; and determining the RSRP threshold based at least in part on the mapping.

Example 29

The method of any of examples 23 to 28, wherein determining that the feedback signal satisfies the one or more conditions comprises: determining a distance between the first device and the second device in the wireless communications system; determining that the distance is greater than or equal to an exclusion distance value of the first device; and determining that an exclusion distance value of the second device excludes the one or more reserved resources overlapping with the one or more reserved resources corresponding to the feedback signal, wherein refraining from transmitting on the one or more resources that overlap with the one or more reserved resources corresponding to the feedback signal is based on determining that the exclusion distance value of the second device excludes the one or more resources overlapping with the one or more reserved resources corresponding to the feedback signal.

Example 30

A method for wireless communications at a first device in a wireless communications system, comprising: receiving a transmission comprising data from a second device; measuring an RSRP of the transmission; determining that the RSRP of the transmission is below an RSRP threshold; and transmitting, to the second device, configuration information to configure the second device to transmit a feedback signal based at least in part on one or more conditions.

Example 31

An apparatus for wireless communications in a wireless communications system: a processor, memory coupled to the processor, the processor and memory configured to perform a method of any of examples 1-15.

Example 32

An apparatus comprising at least one means for performing a method of any of examples 1-15.

Example 33

A non-transitory computer-readable medium storing code for wireless communications in a wireless communications system, the code comprising instructions executable by a processor to perform a method of any of examples 1-15.

Example 34

An apparatus for wireless communications in a wireless communications system: a processor, memory coupled to the processor, the processor and memory configured to perform a method of any of examples 16-22.

Example 35

An apparatus comprising at least one means for performing a method of any of examples 16-22.

Example 36

A non-transitory computer-readable medium storing code for wireless communications in a wireless communications system, the code comprising instructions executable by a processor to perform a method of any of examples 16-22.

Example 37

An apparatus for wireless communications in a wireless communications system: a processor, memory coupled to the processor, the processor and memory configured to perform a method of any of examples 23-29.

Example 38

An apparatus comprising at least one means for performing a method of any of examples 23-29.

Example 39

A non-transitory computer-readable medium storing code for wireless communications in a wireless communications system, the code comprising instructions executable by a processor to perform a method of any of examples 23-29.

Example 40

An apparatus for wireless communications in a wireless communications system: a processor, memory coupled to the processor, the processor and memory configured to perform a method of example 30.

Example 41

An apparatus comprising at least one means for performing a method of example 30.

Example 42

A non-transitory computer-readable medium storing code for wireless communications in a wireless communications system, the code comprising instructions executable by a processor to perform a method of example 30.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device in a wireless communications system, comprising:
    determining a blind retransmission of a packet based at least in part on a previous transmission of the packet and exclusive of feedback by the first device in response to the previous transmission of the packet;
    determining that the packet satisfies one or more conditions based at least in part on the blind retransmission; and
    transmitting a feedback signal relating to the blind retransmission of the packet based at least in part on determining that the packet satisfies the one or more conditions.

2. The method of claim 1, wherein determining that the packet satisfies the one or more conditions comprises:
    determining a hidden node condition associated with the first device in wireless communications with a second device based at least in part on a reference signal received power of the packet, a non-line of sight condition associated with the second device in wireless communications with the first device, or a blocking condition associated with the first device in wireless communications with the second device, or a combination thereof,
    wherein transmitting the feedback signal is based at least in part on the hidden node condition.

3. The method of claim 2, further comprising:
    measuring the reference signal received power of the packet; and
    determining that the reference signal received power of the packet satisfies a reference signal received power threshold,
    wherein transmitting the feedback signal is based at least in part on the reference signal received power of the packet satisfying the reference signal received power threshold.

4. The method of claim 3, further comprising:
    determining the reference signal received power threshold, wherein determining that the reference signal received power of the packet satisfies the reference signal received power threshold is based at least in part on the determined reference signal received power threshold.

5. The method of claim 3, further comprising:
    determining the reference signal received power threshold based at least in part on a modulation coding scheme, a priority of the packet corresponding to the feedback signal, a quality-of-service of the packet corresponding to the feedback signal, or a fifth generation quality indicator of the packet corresponding to the feedback signal, or a combination thereof.

6. The method of claim 3, further comprising:
    receiving, from a network device, control signaling comprising configuration information mapping the reference signal received power threshold to at least one of a modulation coding scheme, a priority of the packet corresponding to the feedback signal, a quality-of-service of the packet corresponding to the feedback signal, or a fifth generation quality indicator of the packet corresponding to the feedback signal, or a combination thereof; and
    determining the reference signal received power threshold based at least in part on the mapping.

7. The method of claim 3, further comprising:
    receiving, from the second device, control signaling comprising configuration information comprising the reference signal received power threshold; and
    determining the reference signal received power threshold based at least in part on the configuration information.

8. The method of claim 3, wherein the reference signal received power threshold is preconfigured or configured by a network device, or a combination thereof.

9. The method of claim 2, further comprising:
    determining location information of the second device;
    determining the non-line of sight condition associated with the second device in wireless communications with the first device based at least in part on the location information of the second device, wherein the location information of the second device indicates a location of the second device compared to a location of the first device, a pathloss estimation between the first device and the second device, or a combination thereof,
    wherein transmitting the feedback signal is based at least in part on the non-line of sight condition.

10. The method of claim 1, wherein determining that the packet satisfies the one or more conditions comprises:
    determining a blocking condition associated with the first device in wireless communications with a second device based at least in part on a pathloss estimation between the first device and the second device, wherein the blocking condition comprises, a pedestrian, a building, or an obstacle, or a combination thereof blocking a line of sight path from the second device to the first device,
    wherein transmitting the feedback signal is based at least in part on the blocking condition.

11. The method of claim 10, further comprising:
    collecting sensor information from a set of sensors of the first device, wherein determining the blocking condition is further based at least in part on the collected sensor information,
    wherein the set of sensors comprises a camera, a radar, or a lidar, or a combination thereof.

12. The method of claim 1, further comprising:
receiving configuration information to configure the first device to transmit a second feedback signal, wherein the configuration information comprises the one or more conditions.

13. The method of claim 1, wherein the wireless communications comprise sidelink communications and support half-duplex communications.

14. The method of claim 13, wherein the sidelink communications comprise vehicle-to-everything communications.

15. The method of claim 1, further comprising:
receiving configuration information to configure the first device to transmit a second feedback signal based at least in part on the one or more conditions.

16. The method of claim 1, wherein transmitting the feedback signal relating to the blind retransmission of the packet indicates an availability of resources for a subsequent retransmission of the packet.

17. A method for wireless communications at a first device in a wireless communications system, comprising:
receiving a feedback signal from a second device in the wireless communications system based at least in part on monitoring a feedback channel;
determining that the feedback signal satisfies one or more conditions; and
excluding, from one or more candidate resources, one or more resources that overlap with one or more reserved resources corresponding to the feedback signal based at least in part on the determining.

18. The method of claim 17, further comprising:
receiving in a preceding packet an indication of the one or more reserved resources corresponding to the feedback signal; and
determining the one or more reserved resources corresponding to the feedback signal based at least in part on the indication, wherein excluding, from the one or more candidate resources, the one or more resources that overlap with the one or more reserved resources corresponding to the feedback signal is based at least in part on the determined one or more reserved resources.

19. The method of claim 18, wherein determining that the feedback signal satisfies the one or more conditions comprises:
measuring a reference signal received power of the feedback signal based at least in part on monitoring the feedback channel; and
determining that the reference signal received power of the feedback signal satisfies a reference signal received power threshold, wherein excluding, from the one or more candidate resources, the one or more resources that overlap with the one or more reserved resources of the feedback signal is based at least in part on the reference signal received power of the feedback signal satisfying the reference signal received power threshold.

20. The method of claim 19, further comprising:
determining the reference signal received power threshold based at least in part on a modulation coding scheme, a priority of the preceding packet corresponding to the feedback signal, a quality-of-service of the preceding packet corresponding to the feedback signal, a fifth generation quality indicator of a preceding transmission, or a combination thereof.

21. The method of claim 19, further comprising:
receiving, from a network device, control signaling comprising configuration information mapping the reference signal received power threshold to at least one of a modulation coding scheme, a priority of the preceding packet corresponding to the feedback signal, a quality-of-service of the preceding packet corresponding to the feedback signal, or a fifth generation quality indicator of the preceding packet corresponding to the feedback signal, or a combination thereof.

22. The method of claim 21, further comprising:
determining the reference signal received power threshold based at least in part on the mapping.

23. The method of claim 17, wherein determining that the feedback signal satisfies the one or more conditions comprises:
determining a distance between the first device and the second device in the wireless communications system;
determining that the distance is greater than or equal to an exclusion distance value of the first device; and
determining that an exclusion distance value of the second device excludes, from the one or more candidate resources, the one or more resources that overlap with the one or more reserved resources corresponding to the feedback signal.

24. A method for wireless communications at a first device in a wireless communications system, comprising:
selecting one or more resources for transmission;
receiving a packet comprising a feedback signal from a second device in the wireless communications system based at least in part on monitoring a feedback channel;
determining that the feedback signal satisfies one or more conditions;
refraining from transmitting on the one or more resources that overlap with one or more reserved resources corresponding to the feedback signal based at least in part on the determining.

25. The method of claim 24, further comprising:
determining the one or more reserved resources corresponding to the feedback signal, wherein a condition of the one or more conditions comprises that the one or more resources overlap the one or more reserved resources corresponding to the feedback signal; and
transmitting an indication to refrain from transmitting the one or more reserved resources based on the refraining.

26. The method of claim 24, further comprising:
receiving in a preceding packet an indication of the one or more reserved resources corresponding to the feedback signal; and
determining the one or more reserved resources corresponding to the feedback signal based at least in part on the indication, wherein refraining from transmitting on the one or more reserved resources is based at least in part on the determined one or more reserved resources corresponding to the feedback signal.

27. The method of claim 24, wherein determining that the feedback signal satisfies the one or more conditions comprises:
measuring a reference signal received power of the feedback signal based at least in part on monitoring the feedback channel; and
determining that the reference signal received power of the feedback signal satisfies a reference signal received power threshold, wherein refraining from transmitting on the one or more resources that overlap with the one or more reserved resources corresponding to the feedback signal is based at least in part on the reference signal received power of the feedback signal satisfying the reference signal received power threshold.

28. The method of claim 26, further comprising:
determining a reference signal received power threshold based at least in part on a modulation coding scheme, a priority of the packet corresponding to the feedback signal, a quality-of-service of the packet corresponding to the feedback signal, or a fifth generation quality indicator of a preceding transmission, or a combination thereof.

29. The method of claim 26, further comprising:
receiving, from a network device, control signaling comprising configuration information mapping a reference signal received power threshold to at least one of a modulation coding scheme, a priority of the packet corresponding to the feedback signal, a quality-of-service of the packet corresponding to the feedback signal, or a fifth generation quality indicator of the packet corresponding to the feedback signal, or a combination thereof; and
determining the reference signal received power threshold based at least in part on the mapping.

30. The method of claim 24, wherein determining that the feedback signal satisfies the one or more conditions comprises:
determining a distance between the first device and the second device in the wireless communications system;
determining that the distance is greater than or equal to an exclusion distance value of the first device; and
determining that an exclusion distance value of the second device excludes the one or more resources overlapping with the one or more reserved resources corresponding to the feedback signal, wherein refraining from transmitting on the one or more resources that overlap with the one or more reserved resources corresponding to the feedback signal is based on determining that the exclusion distance value of the second device excludes the one or more resources overlapping with the one or more reserved resources corresponding to the feedback signal.

31. A method for wireless communications at a first device in a wireless communications system, comprising:
receiving a transmission comprising data from a second device;
measuring a reference signal received power of the transmission;
determining that the reference signal received power of the transmission is below a reference signal received power threshold; and
transmitting, to the second device, configuration information to configure the second device to transmit a feedback signal based at least in part on one or more conditions.

* * * * *